(12) United States Patent
Aoyama et al.

(10) Patent No.: US 7,719,602 B2
(45) Date of Patent: May 18, 2010

(54) ELECTRONIC DEVICE, PHOTOGRAPHING CONTROL METHOD, PHOTOGRAPHING CONTROL PROGRAM, AND INTEGRATED CIRCUIT

(75) Inventors: Susumu Aoyama, Kawasaki (JP); Ken Hayashida, Kawasaki (JP); Toshikazu Houmura, Kawasaki (JP); Kiyoshi Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 927 days.

(21) Appl. No.: 10/826,501

(22) Filed: Apr. 19, 2004

(65) Prior Publication Data

US 2005/0104992 A1 May 19, 2005

(30) Foreign Application Priority Data

Nov. 14, 2003 (JP) ............................. 2003-384728

(51) Int. Cl.
*H04N 5/232* (2006.01)
*G03B 13/36* (2006.01)

(52) U.S. Cl. .......................... 348/345; 396/79; 396/90; 396/103

(58) Field of Classification Search ................. 396/103, 396/124, 79, 137, 147, 90; 348/335, 345, 348/346

See application file for complete search history.

(56) References Cited

U.S. PATENT DOCUMENTS 4,783,677 A 11/1988 Hamada et al. ............. 354/402
4,969,003 A * 11/1990 Ohnuki et al. ................ 396/95

(Continued)

FOREIGN PATENT DOCUMENTS

FR 2 839 230 10/2003

(Continued)

OTHER PUBLICATIONS

European Patent Office Communication including European Search Report for corresponding European Patent Application P101319EP00 dated Mar. 1, 2005.

(Continued)

*Primary Examiner*—Jason Whipkey
(74) *Attorney, Agent, or Firm*—Kratz, Quintos & Hanson, LLP

(57) ABSTRACT

An electronic device can perform photographing by an AF (Auto-Focusing) function and a PF (Pan-Focus) function, and can give improvement of quickness of the taking of an image by automatically selecting an image, which is taken into the device, from a relation between the AF function and a shutter operation. The electronic device has an imaging part which catches an image obtained through an optical system, and also has a focusing mechanism which moves the optical system to an auto-focusing position or a fixed focus position. The electronic device further comprises a switch and a control part. The switch functions as a focusing switch ordering the focusing mechanism a focusing action, and also functions as a shutter switch ordering taking of an image caught by the imaging part. By this, the switch orders the focusing action or the taking of the caught image. The control part, in the case in which the shutter operation of the switch is performed during the focusing action of the focusing mechanism due to the switch, switches the optical system to the fixed focus position from auto-focusing position, and takes a fixed focus image.

16 Claims, 22 Drawing Sheets

U.S. PATENT DOCUMENTS

| | | | |
|---|---|---|---|
| 4,974,002 A | 11/1990 | Ohnuki et al. | 354/400 |
| 5,001,507 A * | 3/1991 | Iida et al. | 348/346 |
| 5,061,951 A * | 10/1991 | Higashihara et al. | 396/104 |
| 5,126,776 A * | 6/1992 | Shono | 396/130 |
| 5,249,058 A * | 9/1993 | Murata et al. | 396/89 |
| 5,701,520 A | 12/1997 | Ishiguro et al. | |
| 5,748,998 A | 5/1998 | Ishiguro et al. | |
| 5,752,106 A | 5/1998 | Yamano | 396/263 |
| 5,815,748 A * | 9/1998 | Hamamura et al. | 348/345 |
| 6,327,437 B1 | 12/2001 | Desormeaux | |
| 6,549,729 B1 * | 4/2003 | Robins et al. | 396/103 |
| 7,119,843 B2 * | 10/2006 | Terasaki et al. | 348/373 |
| 2004/0090546 A1 * | 5/2004 | Doron | 348/240.1 |
| 2005/0036774 A1 * | 2/2005 | Katagishi | 396/55 |

FOREIGN PATENT DOCUMENTS

| | | |
|---|---|---|
| GB | 2 388 271 | 11/2003 |
| JP | 64-068181 | 3/1989 |
| JP | 2-42428 | 2/1990 |
| JP | 04-221944 | 8/1992 |
| JP | 7-56227 | 3/1995 |
| JP | 07056227 A * | 3/1995 |
| JP | 07-104169 | 4/1995 |
| JP | 8-114740 | 5/1996 |
| JP | 9-224184 | 8/1997 |
| JP | 10-186442 | 7/1998 |
| JP | 10-197938 | 7/1998 |
| JP | 2001-13571 | 1/2001 |
| JP | 2001-228523 | 8/2001 |
| JP | 2001-249391 | 9/2001 |
| JP | 2002-209133 | 7/2002 |
| JP | 2002-268126 | 9/2002 |
| JP | 2003-084192 | 3/2003 |
| JP | 2003-140025 | 5/2003 |
| JP | 2003-270522 | 9/2003 |
| JP | 2003-285925 | 3/2007 |
| WO | WO 2005/013606 | 2/2005 |

OTHER PUBLICATIONS

Office Action received from the European Patent Office dated Dec. 9, 2005; 5 pages.

Japanese Office Action issued in corresponding Japanese Patent Application No. 2003-384728 and partial English Translation.

* cited by examiner (A)

(B)

(C)

ELECTRONIC DEVICE, PHOTOGRAPHING CONTROL METHOD, PHOTOGRAPHING CONTROL PROGRAM, AND INTEGRATED CIRCUIT

BACKGROUND OF THE INVENTION

1. Field of the Invention

The present invention relates to an electronic device able to perform photographing of auto-focusing (AF) and a fixed focus (PF: Pan-Focus) in which a focus is fixed to infinity as an example. In particular, the present invention relates to an electronic device, a photographing control method, a photographing control program and an integrated circuit in which selection of taking of an auto-focusing image or a fixed focus image is performed automatically in accordance with a state of affairs in photographing.

2. Description of the Related Art

An electronic device providing a photographing function, a telephone function and an information processing function, for example, is far above a level that it is not necessary to carry a mobile phone and a camera separately, can perform selectively photographing, a telephone or information processing. Furthermore, the device can modify and edit a photographed image to a desired configuration, and can transmit and receive it. Because of this, the synergistic use of the respective functions is possible. For example, in a mobile terminal having a photographing function, a photographic chance is rapidly increasing and a focus function corresponding to a photographic scene is required. An AF function and a PF function are used as a focus function like this, and the easiness of photographing is designed to be given by selection of a focus function.

By the way, as prior patent documents in connection with a camera providing an AF function and a PF function, for example, the Japanese Patent Laid Open Publications No. 7-56227, No. 10 186442, No. 8-114740 and No. 10-197938 are in existence.

The publication No. 7-56227 has an object which, by using an existing liquid crystal panel, button and so on, makes it possible to switch to a mode such as an AF mode, a distant view mode and a fixed focus mode and makes it possible to display that mode. And, this publication discloses constitution in which the respective modes such as the AF mode, the distant view mode and the fixed focus mode are switched in order every time that one mode selecting switch is pushed once.

In the publication No. 10-186442, an auto-focusing camera provides a fixed focus mode. This publication has an object which makes it possible to photograph at proper focus even in the case of a person unaccustomed to the operation of a camera and a pictured object which is hardly brought into focus in an AF mode. And, this publication discloses constitution in which switching between an auto-focusing control mode and a fixed focus mode is possible.

The publication 8-114740 has an object which provides an auto-focusing camera excellent in switching between an AF mode and a distant view mode (a PF mode). And, this publication discloses constitution in which either of the AF mode and the PF mode is set in a mode set part and the switching to another mode from a mode set in the mode set part can be performed by a mode switch.

Further, the publication No. 10-197938 has an object that distance range brought into focus can be accurately grasped and a photographer can take a picture at ease even in the case of the inaccurately decision of a distance by eye-measurement without depending on intuition of the photographer, and discloses constitution for giving width to range being in focus.

By the way, according to the publications No. 7-56227, No. 10-186442, No. 8-114740 and No. 10-197938, although it is possible to switch the AF function or the PF function by a switch according to a photographic scene, the operation of a switch for mode selection like this is troublesome and also becomes a cause missing a photographic chance. Further, even if the rapidity of an AF function is improved, a time required for bringing into focus is longer in comparison with a photographic chance changing in a moment. Also, if priority is given to a PF function from prediction of the coming of a photographic chance, it is necessary for a photographer to switch carefully to an AF function from the PF function according to a photographic scene. It is necessary to urge a photographer to perform operation like this every photographing, and a precious AF function is to be spoiled if the photographer forgets the switching operation.

Further, although in the publication No. 10-197938 range being in focus is shown in a finder in addition to a pictured object, if a display like this occupies an inside of the finder, range for showing a pictured object is narrowed. Also, although a confirmation of the in-focus range displayed separately and cutting range of a pictured object becomes necessary, a confirmation like this is to give tired feeling to a photographer.

The problems mentioned above can not be solved even if technology disclosed in the above-mentioned patent documents is used.

SUMMARY OF THE INVENTION

The present invention relates to an electronic device which is able to photograph by means of a AF (auto-focusing) function and a PF (pan-focus: a fixed focus), and an object of the present invention is to make it possible to select automatically a taken image from a relation between a AF function and a shutter operation, and is to give improvement of quickness of taking of an image.

In order to attain the object mentioned above, an electronic device according to the present invention is an electronic device (a mobile terminal 2 and/or a camera 4) which has an imaging part (a CCD 28) catching an image obtained through an optical system (a lens 26) and a focusing mechanism (32) moving the optical system to an auto-focusing position or a fixed focus position. The device further has constitution which comprises a switch (an input operation part 24, a side key 204) that functions as a focusing switch ordering the focusing mechanism a focusing action and also functions as a shutter switch ordering taking of an image caught by the imaging part, the switch ordering the focusing action or the taking of the caught image, and a control part (a photographing control part 6) that, in the case in which a shutter operation of the switch is performed during the focusing action of the focusing mechanism due to the switch, switches the optical system to the fixed focus position from the auto-focusing position and takes a fixed focus image.

According to constitution like this, the image of a pictured object is formed on the imaging part through the optical system, and that image is caught. The focusing mechanism can give an image of a state, which is in focus, to the imaging part by moving a focal position of the optical system. The switch provides a function serving as the auto-focusing switch ordering the focusing mechanism a focusing action and a function serving as the shutter switch ordering the taking of an image caught by the imaging part, and commands the focusing action or the taking of the caught image. Therefore, although the control part receives a focusing command of the switch and makes the focusing mechanism execute a focusing process, in the case in which a taking command of a caught image is generated by the shutter switch function in the middle of that focusing action, the control part switches the optical system to the fixed focus position from the auto-focusing position through the focusing mechanism, and an image at the fixed focus position is taken. If a shutter operation is performed like this during a focusing action, an urgent shutter process becomes possible at a photographic scene in which there is some fear that a user will miss a shutter chance if the user waits a time required for bringing into focus. Hence, the quick taking of an image meeting the needs of a photographic scene or a state of affairs in photographing can be performed.

In order to attain the object mentioned above, the electronic device may also be constituted so that the control part compares between a time required for bringing into focus in the focusing mechanism and a time from starting of the focusing action to starting of the shutter operation, and changes the optical system to the auto-focusing position or the fixed focus position based on a result of this comparison. According to constitution like this, the quick taking of an image meeting the needs of a shutter process can be performed without waiting the lapse of a time required for bringing into focus in the focusing mechanism. In this case, the fixed focus is not limited to the focal length of infinity. The fixed focus may also be a specified focus position in the middle of focusing.

In order to attain the object mentioned above, an electronic device according to the present invention is an electronic device which has an imaging part catching an image obtained through an optical system and a focusing mechanism moving the optical system to an auto-focusing position or a fixed focus position, and may also have constitution which comprises a switch that functions as a focusing switch ordering the focusing mechanism a focusing action and also functions as a shutter switch ordering taking of an image caught by the imaging part, the switch ordering the focusing action or the taking of the caught image according to a condition of operation, and a control part that, in the case in which a shutter operation of the switch is performed during the focusing action of the focusing mechanism due to the switch, takes an image, at a focal position in the middle of the focusing action, which is caught by the imaging part.

According to constitution like this, in the case in which a shutter process is started in the middle of a focusing process due to the switch, an image which is caught by the imaging part in the middle of a focusing action can be taken. Hence, the quick taking of an image corresponding to a photographic scene or a state of affairs in photographing becomes possible.

In order to attain the object mentioned above, the electronic device may also be constituted so that the above-mentioned switch is provided as a first switch and a switch used for photographing by a fixed focus is also provided as a second switch separate from the first switch. According to constitution like this, the photographing by a fixed focus or the photographing by auto-focusing can be selected by the first or second switch. By this, to respond to quick photographing corresponding to a photographic scene or a state of affairs in photographing becomes possible.

In order to attain the object mentioned above, the electronic device may also be constituted so that the above-mentioned switch functions as the auto-focusing switch at a state of a half-push and functions as the shutter switch at a state of a full-push. According to constitution like this, managing a chain of processes from maintenance of an AF process until the taking of an image by a single switch becomes possible.

In order to attain the object mentioned above, the electronic device may also be constituted so that the electronic device has a first housing part (an operating-side housing part 46) providing the above-mentioned imaging part, a second housing part (a displaying-side housing part 48) providing the above-mentioned switch, and a coupling part (a hinge part 50) coupling the first housing part and the second housing part so that the first and second housing parts can be folded up.

In order to attain the object mentioned above, a photographing control method of an electronic device according to the present invention is a photographing control method of an electronic device which has an imaging part catching an image obtained through an optical system and a focusing mechanism moving the optical system to an auto-focusing position or a fixed focus position, and has constitution which includes a process that detects a shutter operation under a focusing action of the focusing mechanism, a process that detects the shutter operation and switches to the fixed focus position from the auto-focusing position of the optical system under the focusing action, and a process that takes a fixed focus image caught by the fixed focus. According to constitution like this, in the case in which a shutter operation is performed in the middle of a focusing action, the switching to an image by means of the fixed focus from the auto-focusing is performed, and that image is taken. Hence, quick photographing corresponding to scene can be performed.

In order to attain the object mentioned above, the photographing control method of the electronic device may also be constituted so that the method further includes a process that superimposes a focusing mark representative of a distance between a pictured object and the optical system on an image, under the above-mentioned focusing action, which is caught by the imaging part, and displays it. That is, the focusing mark is displayed according to the image of a pictured object receiving a focusing action, and represents depth of focus. According to constitution like this, by confirming visually a focusing mark displayed on an image caught by the imaging part, a user can recognize which pictured object in an image is brought into focus by the optical system, from the focusing mark.

In order to attain the object mentioned above, a photographing control method of the above-mentioned electronic device is a photographing control method of an electronic device which has an imaging part catching an image obtained through an optical system and a focusing mechanism moving the optical system to an auto-focusing position or a fixed focus position, and may also have constitution which includes a process that detects a shutter operation under a focusing action of the focusing mechanism, and a process that detects the shutter operation and takes an auto-focusing image caught by the imaging part during the focusing action.

In order to attain the object mentioned above, a photographing control program of an electronic device according to the present invention is a photographing control program of an electronic device which has an imaging part catching an image obtained through an optical system and a focusing mechanism moving the optical system to an auto-focusing position or a fixed focus position, and has constitution which includes a step that detects a shutter operation under a focusing action of the focusing mechanism, a step that detects the shutter operation and switches to the fixed focus position from the auto-focusing position of the optical system under the focusing action, and a step that takes a fixed focus image caught by the fixed focus.

This photographing control program is executed by a processing part of the electronic device having a photographing function and realizes the photographing control method described before. In the case in which a shutter operation is performed in the middle of a focusing action, the switching to a fixed focus image from an image in the middle of the focusing action is performed, and that image can be taken. Therefore, the taking of an image according to a photographic scene or a state of affairs in photographing can be performed, and the improvement of its quickness is given.

In order to attain the object mentioned above, a photographing control program of the above-mentioned electronic device is a photographing control program of an electronic device which has an imaging part catching an image obtained through an optical system and a focusing mechanism moving the optical system to an auto-focusing position or a fixed focus position, and may also have constitution which includes a step that detects a shutter operation under a focusing action of the focusing mechanism, and a step that detects the shutter operation and takes an auto-focusing image caught by the imaging part during the focusing action.

In order to attain the object mentioned above, an integrated circuit according to the present invention is an integrated circuit to which an imaging part catching an image obtained through an optical system and a focusing mechanism moving the optical system to an auto-focusing position or a fixed focus position are connected externally, and has constitution which includes a detection part (an AF processing part 68) that detects a shutter operation under a focusing action of the focusing mechanism, and a control part that, on the basis of a detection of the detection part, switches to the fixed focus position from the auto-focusing position of the optical system under the focusing action and takes a fixed focus image caught by the fixed focus.

The integrated circuit of constitution like this is mounted on an electronic device having a photographing function, and makes the photographing control method or program described before execute. In the case in which a shutter operation is performed in the middle of a focusing action, the switching to a fixed focus image from an image in the middle of the focusing action is performed, and that image is taken. Therefore, the quick taking of an image according to a photographic scene or a state of affairs in photographing becomes possible.

In order to attain the object mentioned above, an integrated circuit according to the present invention is an integrated circuit to which an imaging part catching an image obtained through an optical system and a focusing mechanism moving the optical system to an auto-focusing position or a fixed focus position are connected externally, and may also have constitution which includes a detection part that detects a shutter operation under a focusing action of the focusing mechanism, and a control part that, on the basis of the shutter operation of the detection part, takes an auto-focusing image in the middle of the focusing action.

As described above, the present invention relates to the electronic device having the photographing function by means of the AF function or the PF function, and improves an image taking function meeting the needs of a photographic scene and a state of affairs in photographing and realizes the development of high function. The present invention can be used in a mobile terminal, a digital camera and so on, and is useful. Further, if the features and advantages of the present invention are enumerated, these are as in the following.

(1) By being constituted so that the switching to a fixed focus image from an auto-focusing image in the middle of a focusing action is performed and that image is taken in response to a shutter process under the focusing action, quick photographing according to a state of affairs in photographing can be performed, and an inconvenience such as missing a shutter chance can be avoided.

(2) By being constituted so that an auto-focusing image in the middle of a focusing action is taken in response to a shutter process under the focusing action, quick photographing according to a state of affairs in photographing can be performed, and an inconvenience such as missing a shutter chance can be avoided.

(3) By being constituted so that a focusing switch and a shutter switch are assigned to a single switch, quickness and simplicity of a chain of managements of focusing operation and taking of an image can be improved, and it can also contribute to simplification of the constitution of a switch.

(4) By superimposing a focusing mark representative of a distance between a pictured object and an optical system on an image in the middle of a focusing action and displaying it, it is possible to confirm visually which pictured object is brought into focus, from the focusing mark in an image.

BRIEF DESCRIPTION OF THE DRAWINGS

The foregoing and other objects, features and attendant advantages of the present invention will be appreciated as the same become better understood by means of the following description and accompanying drawings wherein.

DETAILED DESCRIPTION OF THE PREFERRED EMBODIMENTS

First Embodiment

Figure 1:
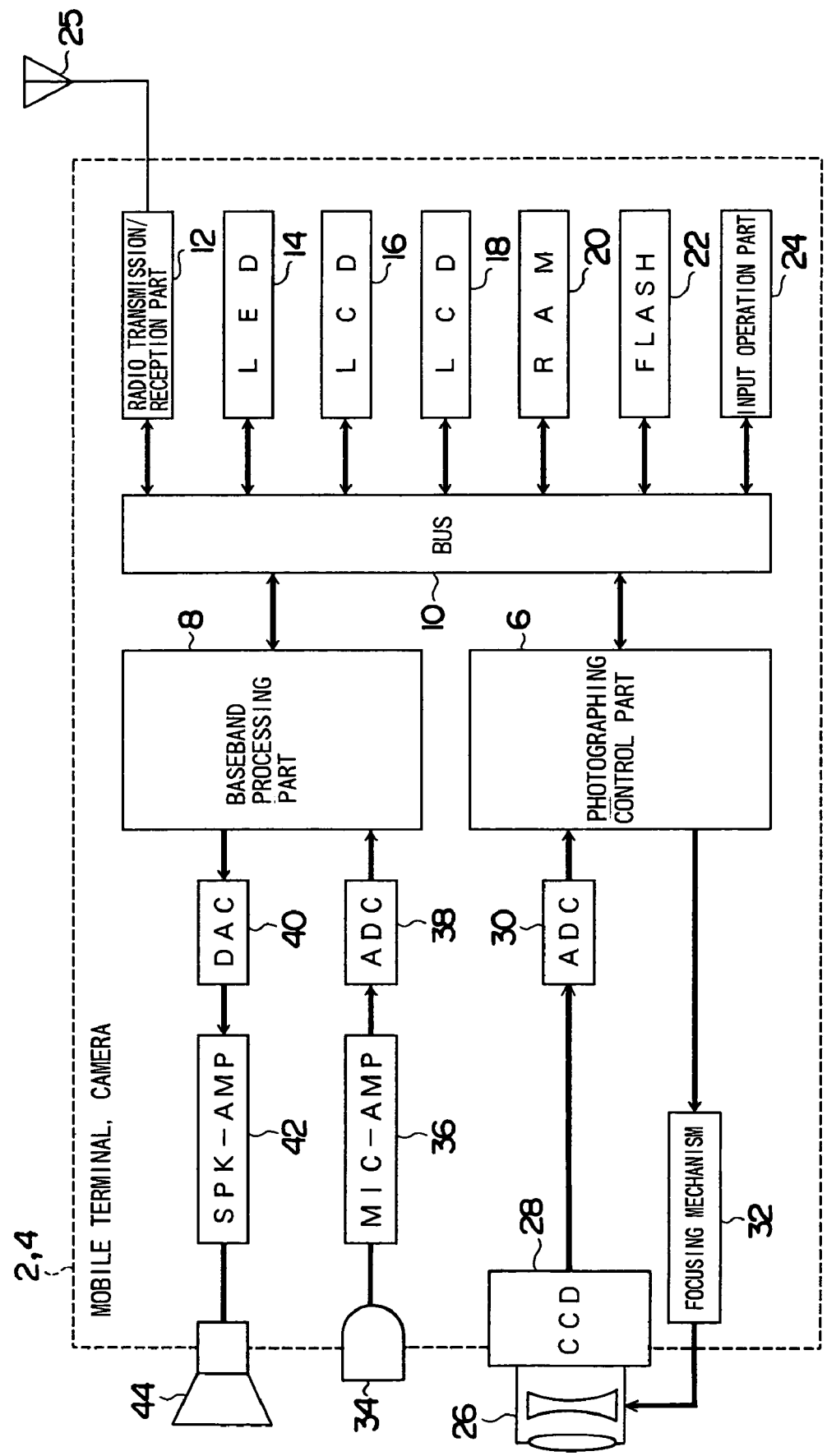
FIG. 1 is a block diagram showing an electronic device according to a first embodiment of the present invention.

A first embodiment of an electronic device and a photographing control method according to the present invention is explained by referring to FIG. 1. FIG. 1 shows an outline of the electronic device.

The electronic device according to this embodiment constitutes a mobile terminal 2 and a camera 4, the mobile terminal 2 has a telephone function and an information processing function, and the camera 4 has a photographing function such as photographing of an image. These mobile terminal 2 and camera 4, as described later, use some of function parts in the device in common, and can be actuated simultaneously or selectively. A photographing control part 6 is a processing part which takes charge of photographing control of the camera 4, and, for example, is constituted by an LSI (Large Scale Integration) serving as an integrated circuit having internally a signal detection part, a processor, a storage part and so on. In this first embodiment, the photographing control by the photographing control part 6, for example, includes many kinds of processes shown in the following.

(1) Each process of auto-focusing (hereinafter "AF") or a pan-focus (hereinafter "PF") which is selected by the operation of a switch.

(2) A catching process of an image under the AF or the PF.

(3) A taking process of an image due to a shutter process under the AF.

(4) Displaying an AF mark representative of a state under the AF or an AF in-focus mark at the time of a state being in focus, for an image on a finder under the AF.

(5) Other photographing control processes. Although the process of the above item (3) is the taking process of a PF image switched to the PF image from an AF image in the middle of a focusing action under the AF, this image taking process may also be a taking process of an AF image in the middle of a focusing action under the AF.

A baseband processing part 8 is a processing part which takes charge of execution of a communication function of a telephone function and so on, and photographing control part 6 and baseband processing part 8, for example, are constituted by one microprocessor or separate microprocessors.

Further, the photographing control part 6 and the baseband processing part 8 are linked through a bus 10. To the bus 10, for example, a radio transmission/reception part 12, an LED (Light Emitting Diode) 14 as an optical presentation part, first and second LCDs (Liquid Crystal Display) 16 and 18 as an information presentation part, a RAM (Random-Access Memory) 20 as an information storage part, a flash memory (FLASH) 22 as an image information storage part and so on, an input operation part 24, and so on are connected. The radio transmission/reception part 12 converts into a radio signal including various kinds of information of voice information, image information and so on and transmits it through an antenna 25, and also receives a radio signal through the antenna 25. The LED 14 is an example of an indication part or an indicator, and is used for the indication of a function, a notification and so on. For example, the LED 14 is lighted at the time of reception of a call and at the time of the operation of a shutter, and notifies an operating state. Each of the LCDs 16 and 18 is an example of the information presentation part. In the case of a mail mode as an example of a communication mode, the LCDs 16 and 18 displays character information, image information and so on for transmission and reception. Further, in the case of photographing, the LCDs 16 and 18 constitute a finder displaying a caught image of the camera 4, and display the display of an AF image or a PF image, an image taken into the storage part, the AF in-focus mark and so on. The RAM 20 is a storage part storing information in the middle of processing, and the FLASH 22 stores information of a decided image described above and so on. Further, the input operation part 24, for example, is constituted by a plurality of key switches, and includes various kinds of switches, such as input switches inputting a phone number, a focus key ordering the AF and a fixed focus shutter key ordering the PF and a shutter.

Further, in a side of the photographing control part 6 an optical system, an image input part and so on are constituted, and, as an example of that, the optical system having a lens 26, a CCD (Charge Coupled Device) 28 as an imaging part, an analog-digital converter (ADC) 30 and a focusing mechanism 32 are provided. The lens 26 constitutes the optical system which projects the image of a pictured object on the CCD 28. The CCD 28 catches an image imaged through the lens 26 and converts into an image signal which is an analog electric signal, and also provides functions of an exposure, an electronic shutter and so on. The ADC 30 is provided in the case in which an image signal from the CCD 28 is an analog signal, and converts the analog signal into a digital signal and inputs to the photographing control part 6. Further, the focusing mechanism 32 has an AF function and a PF function, and changes a focusing distance of the lens 26. In this case, by the photographing control part 6, the lens 26, the CCD 28, the ADC 30 and the focusing mechanism 32, an auto-focusing mechanism which controls a focus of the lens 26 to an optimum position by means of a computation process of image information obtained through the lens 26 is constituted.

Further, in a side of the baseband processing part 8, a microphone 34 as a voice input part for inputting a voice is provided. A voice signal from the microphone 34 is amplified by an amplifier (MIC-AMP) 36, and is given to the baseband processing part 8 after being converted into a digital signal by the analog-digital converter (ADC) 38. Further, voice information which is output from the baseband processing part 8 is converted into an analog signal by way of a digital-analog converter (DAC) 40, and is given to a speaker 44 after being amplified by an amplifier (SPK-AMP) 42.

In constitution like this, a photographing mode, a telephone mode or the like is selected by a switching operation of the input operation part 24. If the photographing mode is selected, the camera 4 is started, and an image detected by the CCD 28 through the lens 26 is displayed on the LCD 16. This image can be made to display on a side of the LCD 18 by means of the switching of display by the input operation part 24.

Further, in the photographing mode, an AF mode is executed by the operation of a shutter key which is set in the input operation part 24. For example, an AF process is executed at the state of a half-push of the shutter key. At this time, on the LCD 16 constituting a finder, an image which is caught by the CCD 28 through the lens 26 is displayed. Along with this, the AF mark (FIG. 11) representative of a distance between the lens 26 and a pictured object or the in-focus mark at the time of the completion of focusing is superimposed and is displayed. As a shape of this AF mark, for example, its size represents depth of focus and a distance between the lens 26 and a pictured object. Then, if the shutter key is operated to the state of a full-push from this state, the caught image is decided and is taken, and is stored in the FLASH 22. For a store of an image, other storage mediums may also be used.

Further, if a PF mode is selected by the shutter key which is set in the input operation part 24, a fixed focus image which is caught by the CCD 28 is to be stored in the FLASH 22 likewise by the operation of the shutter key. The AF process or the PF process can be selected freely by the switching operation of the input operation part 24 or the operation of a key assigned the shutter key.

Further, if the shutter key of the input operation part 24 is shifted to the state of the full-push from the state of the half-push during the AF, the shutter operation is to be performed before the completion of focusing. In this case, assuming that a time required for bringing into focus in the focusing mechanism 32 is represented by "tf" and a time from starting of a focusing action by the AF to starting of a shutter operation is represented by "ts", in the case in which a relation of "tf>ts" is formed, the AF process is stopped, and a shift to the PF process is performed. Then, an image, which is imaged on the CCD 28 through the lens 26 and is caught by the CCD 28 in the PF process, is taken into the photographing control part 6 and is stored in the FLASH 22. According to processes like this, the taking of an image of a pictured object corresponding to a photographic scene and a state of affairs in photographing becomes possible, and missing a shutter chance can be avoided.

Further, in connection with the decision of an image by the shutter operation before the completion of focusing under the AF and the taking of that image, the AF process is stopped without being shifted to the PF process from the AF process, and an image in the middle of a focusing action, which is caught by the CCD 28, is taken into the photographing control part 6 and is stored in the FLASH 22. Also by processes like this, the taking of an image of a pictured object corresponding to a photographic scene and a state of affairs in photographing becomes possible, and missing a shutter chance can be avoided. In this case, in order to distinguish from an image after the completion of focusing or a PF image in respect to the image in the middle of the focusing action, information showing that the image is an image in the middle of the focusing action may also be displayed on LCD 16 in a taken image or in relation to that image, or these pieces of information may also be stored in the FLASH 22 and so on together with the image.

In the case in which the telephone mode is selected, identification information such as a phone number input from the input operation part 24, voice information from the microphone 34 and other pieces of information are converted into a radio signal by processing of modulation and so on and is transmitted to a telephone station and so on from the antenna 25, and a transmitted signal from the telephone station and so on is received through the antenna 25. At the time of a talk to the other party, a voice signal input to the microphone 34 is amplified by the amplifier 36, and is given to the baseband processing part 8 after being converted into a digital signal by the ADC 38. On the other hand, at the time of reception of a talk from the other party, processing of demodulation and so on is given to information of a voice signal or the like which is received, voice information is output as a voice from the speaker 44 after being converted into an analog signal via the DAC 40 and being amplified by the amplifier 42. In a telephone mode like this, an image stored in the FLASH 22 and an image caught by the CCD 28 can be transmitted from the radio transmission/reception part 12 by way of an information process and a modulation process by the baseband processing part 8, and reception of an image from outside can also be performed.

Figure 2:
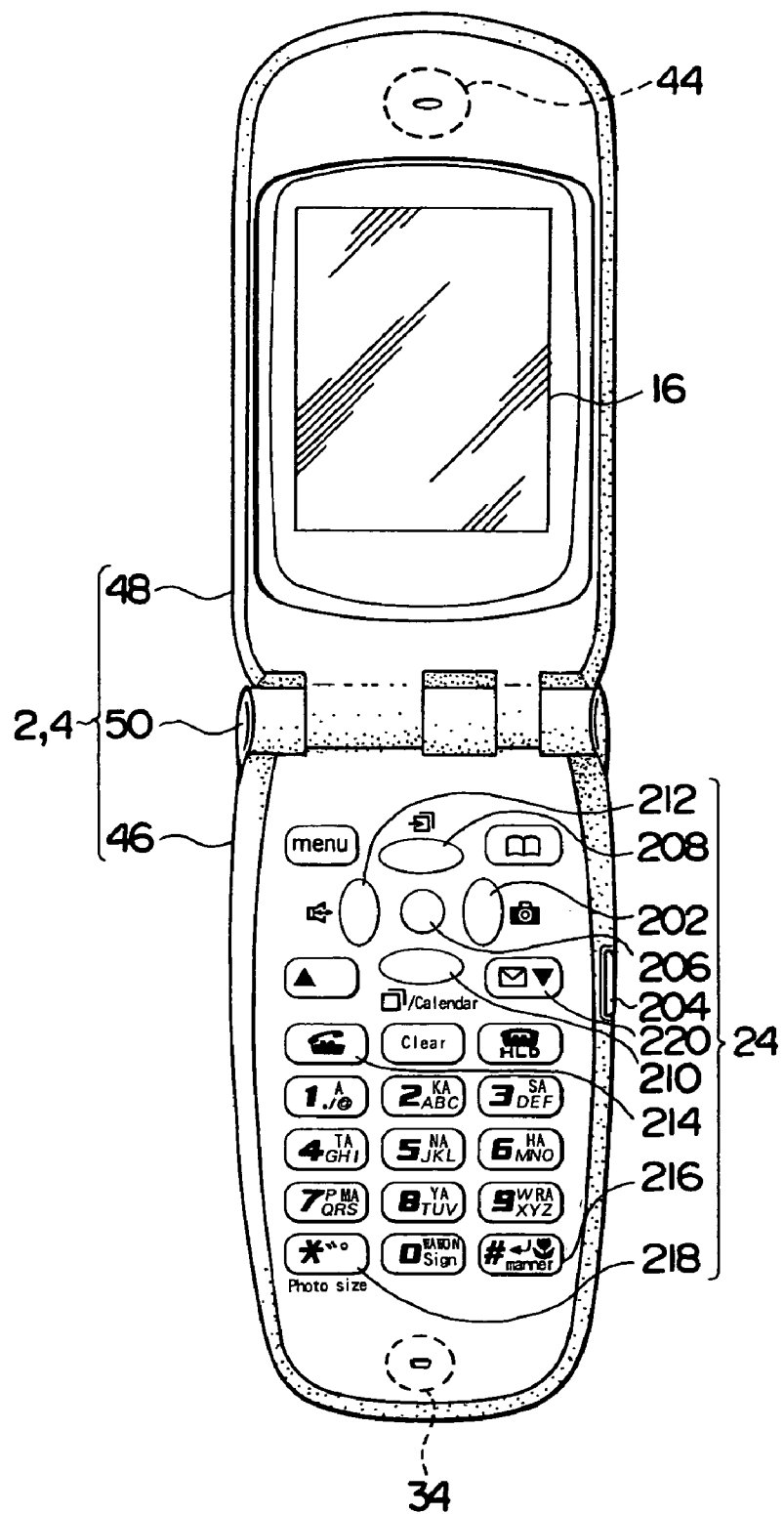
FIG. 2 is a plan view showing an appearance shape of a front side of the electronic device.
Figure 3:
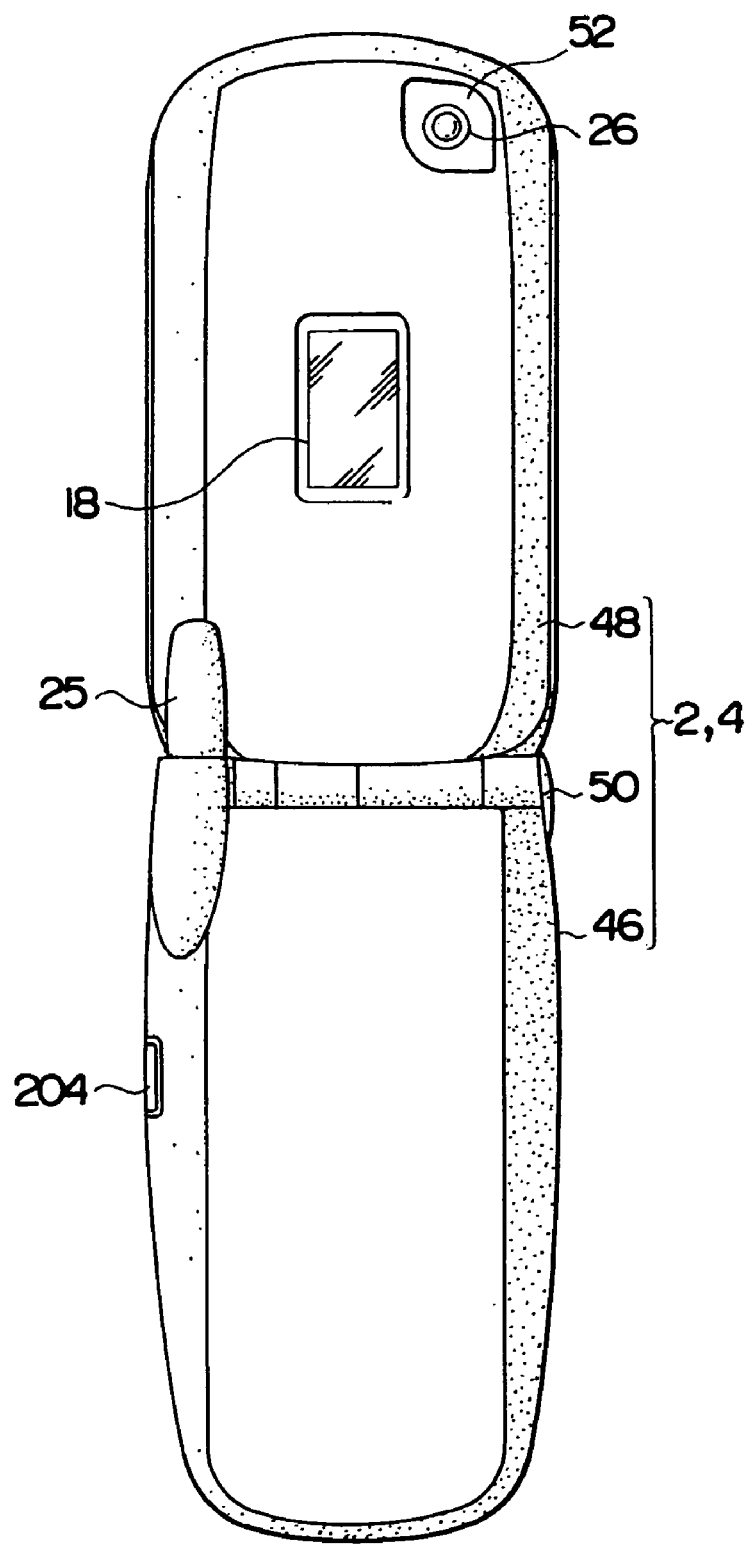
FIG. 3 is a plan view showing an appearance shape of a rear side of the electronic device.

Next, an appearance shape of the electronic device which constitutes the mobile terminal 2 and the camera 4 is explained by referring to FIG. 2 and FIG. 3. FIG. 2 shows a shape of a front side of the electronic device, and FIG. 3 shows a shape of a rear side of the electronic device. In these drawings, the same components as those of the embodiment shown in FIG. 1 are shown by the same reference numerals, and thereby a relation between these drawings and FIG. 1 is shown.

In the electronic device of this embodiment, an operating-side housing part 46 as a first housing part and a displaying-side housing part 48 as a second housing part are coupled by a hinge part 50 as a coupling part, and are constituted so that the electronic device can be folded up. In the operating-side housing part 46, the input operation part 24, the microphone 34 and so on are arranged, and, in the displaying-side housing part 48, the LCD 16, the speaker 44 and so on are arranged. In the input operation part 24, a plurality of key-switches is arranged in the front part and the side part. In this embodiment, by using existing switches which are assigned to the operation of a telephone function, these existing key-switches are assigned to a camera key 202, a side key 204, which is a first switch, used as both a focusing switch and a shutter switch, a shutter key 206 which is a second switch, a zoom-up key 208, a zoom-down key 210, a frame selecting key 212, a finder changing key 214, a close-up mode key 216, a size changing key 218, a shutter mode selecting key 220 and so on. The camera key 202 is used for switching to the photographing mode from the telephone mode, and is used as a frame selecting key while executing the photographing mode. Two functions are assigned to the side key 204 in the photographing mode. That is, starting and execution of the AF process is performed by the state of a half-push of the side key 204, and shutter operation is performed by the state of a full-push of the side key 204. In the case in which the side key 204 is operated to the state of the full-push in the middle of the AF process, a shutter operation command is input to the photographing control part 6. Further, the shutter key 206 is used for shutter operation of the PF process.

Further, the side key 204 is arranged at a side face of the operating-side housing part 46, and, in a rear side of the displaying-side housing part 48, a camera module 52 is arranged at an upper portion, and the LCD 18 is arranged at a center portion.

According to constitution like this, the photographing mode is given by a press of the camera key 202, and an image detected by the CCD 28 through the lens 26 is displayed on the LCD 16 constituting a finder. If the finder changing key 214 is pressed, an image display is switched to a side of the LCD 18 from the LCD 16, and an image which is caught is displayed on the LCD 18. A frame is switched by a press of the frame selecting key 212 or the camera key 202 to which a frame selecting key is assigned. Further, the switching to a zoom mode is performed by a press of the zoom-up key 208 and the zoom-down key 210. The increment of zoom magnification is given by a press of the zoom-up key 208, and the decrement of the zoom magnification is given by a press of the zoom-down key 210. Further, by a press of the close-up key 216, a shift to a close-up mode or cancellation thereof is performed. Furthermore, by a press of the size changing key 218, the size of an image can be changed.

Further, if the side key 204 is pressed, the AF mode is selected and the AF process is executed under the state of the half-push of the side key 204. If the side key 204 is operated to the state of the full-push from the state of the half-push, an image which is caught is decided and the image is stored in the FLASH 22. Further, if the shutter key 206 is pressed, the PF mode is selected and a fixed focus is given, and a PF image is to be stored in the FLASH 22. In this case, the following constitution may also be given. That is, if the shutter key 206 is pressed under the state of the half-push of the side key 204, an AF image or an AF image in the middle of a focusing action is decided and is stored in the FLASH 22 similarly.

Figure 4:
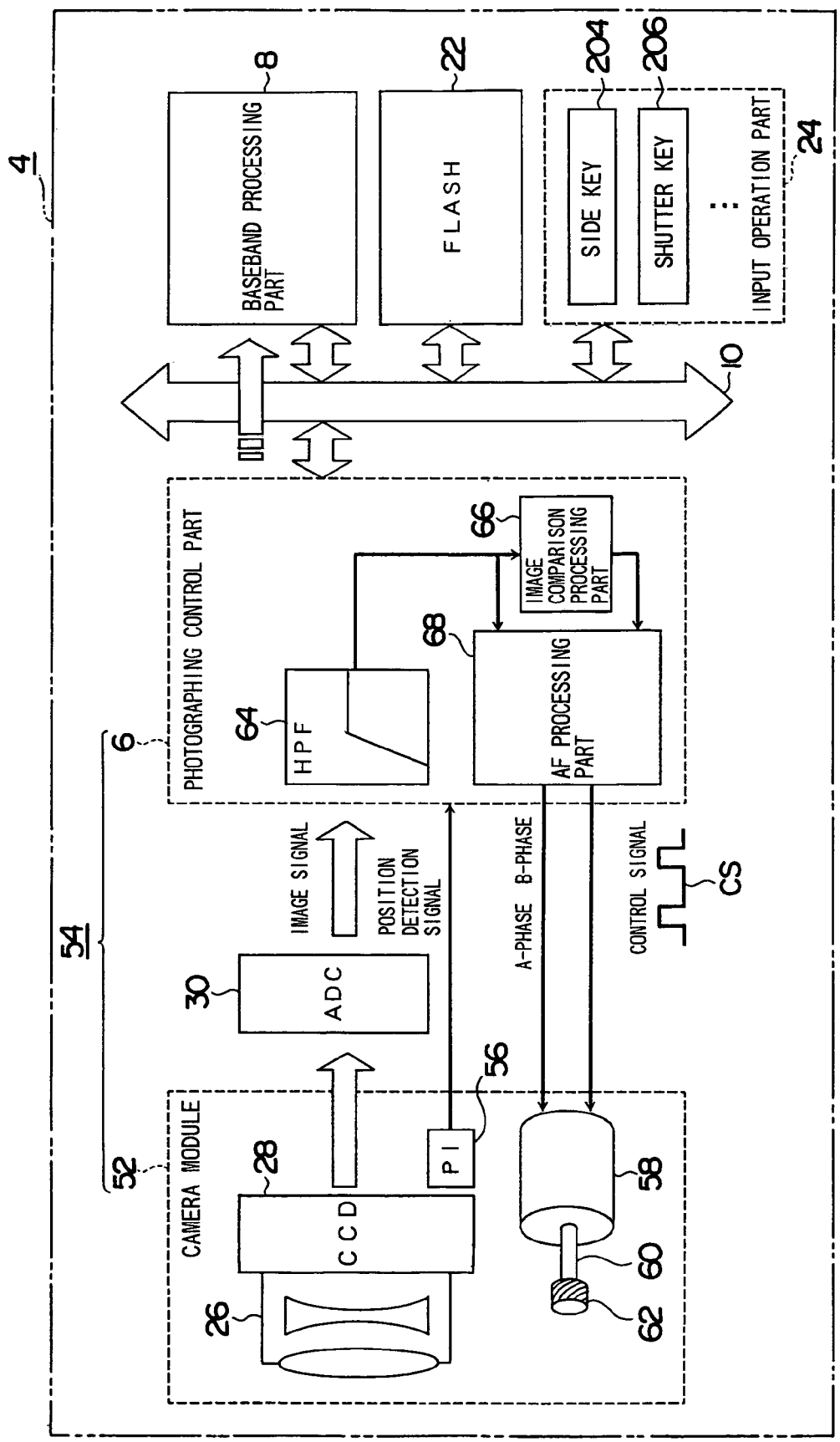
FIG. 4 is a block diagram showing an AF mechanism mounted on the electronic device.

Next, the AF mechanism of the mobile terminal 2 is explained by referring to FIG. 4. FIG. 4 shows an outline of the AF mechanism. In FIG. 4, the same components as those of FIG. 1 are shown by the same reference numerals, and thereby a relation between FIG. 4 and FIG. 1 is shown.

In this AF mechanism 54, the camera module 52 has the lens 26, the CCD 28, a position detecting part (PI: Photo Interrupter) 56, a stepping motor 58 and so on. The PI 56 is set within focus adjusting range of the lens 26, and represents a reference position of a focus thereof. Further, the stepping motor 58 constitutes a driving part moving a position of the lens 26 before and behind, has a gear 62 attached to a rotating axis 60 thereof, and moves the lens 26 forward or backward by a predetermined quantity by receiving a control signal CS from the photographing control part 6. In the camera module 52, an image signal from the CCD 28 which receives an image through the lens 26 is obtained, and a position detection signal representative of a moved position of the lens 26 is also obtained. That is, the camera module 52 performs a focusing action of the lens 26, and also constitutes a position detecting part detecting a position of the lens 26.

To the photographing control part 6, the image signal which is an analog signal is given after being converted into a digital signal by the ADC 30, and the position detection signal from the PI 56 is also given. In the photographing control part 6, as a signal processing part, a high pass filter (HPF) 64, an image comparison processing part 66 and an AF processing part 68 are provided. The HPF 64 extracts a high frequency image signal from the image signal. This high frequency image signal is used for computation of focusing information, and so on. The image comparison processing part 66 compares between the newest image and a last image, for example, by using timing of the taking of an image as a reference, and outputs the focusing information as a result of that comparison.

Further, the AF processing part 68 receives key-in of the side key 204, the shutter key 206 and so on of the input operation part 24. The AF processing part 68 functions as a detection part which detects a shutter operation under a focusing action of the AF mechanism 54. Further, the AF processing part 68 functions as a control part which, on the basis of detection of the detection part, executes a switching process to a fixed focus position from an auto-focusing position of the lens 26 under a focusing action, a taking process of a fixed focus image at a fixed focus, a process controlling a position of the lens 26 according to the image information, and so on. Therefore, in order to realize functions like this, the AF processing part 68 has internally a processor, a storage part storing a photographing control program and so on, a lens position counter as a storage part memorizing a current position of the lens 26 and a lens position according to focal length, and so on. The photographing control program includes processing which has a step detecting a shutter operation under a focusing action of the AF mechanism 54, a step detecting the shutter operation and switching to the fixed focus position from the auto-focusing position of the lens 26 under a focusing action, and a step taking a fixed focus image, which is caught, into the storage part.

Further, in the focusing process, the AF processing part 68 receives an output of the image comparison processing part 66 together with an output of the HPF 64, and outputs an A-phase signal and a B-phase signal, which are a two-phase signal, as a control signal CS representative of regular rotation or reverse rotation of the stepping motor 58 and a rotational quantity thereof. These processes may also be performed as signal processing by hardware, or may also be performed as signal processing by software using a microprocessor.

Further, an image, which is caught by the CCD 28 and is taken into the AF processing part 68 of the photographing control part 6, is given to the baseband processing part 8 through the bus 10, and is also given to the FLASH 22. By this, an image which is taken based on the shutter operation is stored in the FLASH 22.

Figure 5:
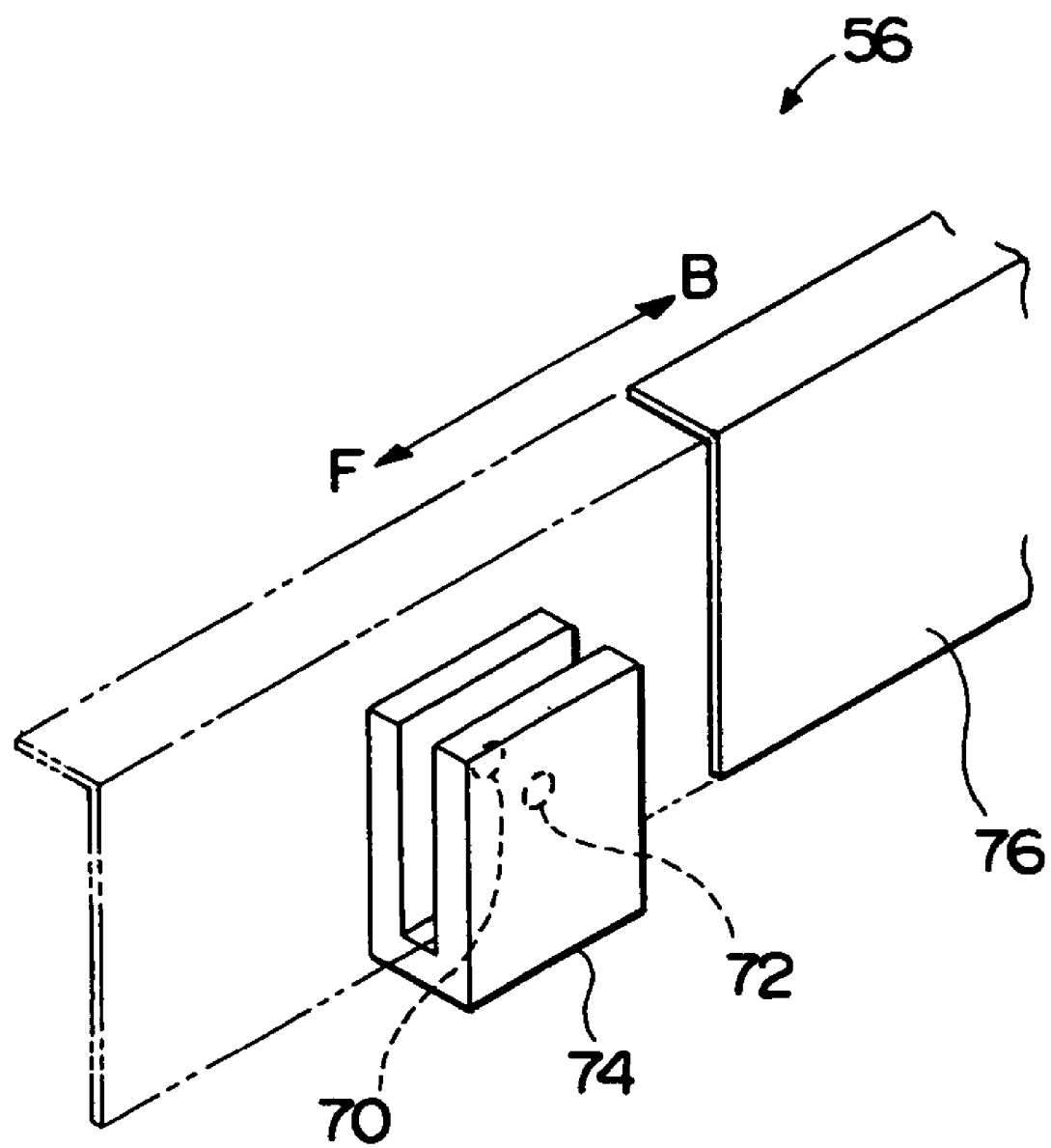
FIG. 5 is a perspective view showing an example of a position detecting part.

Next, the position detecting part detecting a position of the lens 26 in the camera module 52 is explained by referring to FIG. 5. FIG. 5 shows an outline of the PI 56 which is the position detecting part.

This PI 56 has a photo coupler 74 in which a light emitting element 70 and a light receiving element 72 confront each other at regular intervals. A movable screening plate 76 is provided between the light emitting element 70 and the light receiving element 72, and this screening plate 76 is arranged at a side of the lens 26. If the lens 26 is moved by the AF mechanism 54, the screening plate 76 moves with a movement of the lens 26. A beam to the light receiving element 72 is prevented if the screening plate 76 moves to an F-direction, and the light receiving element 72 receives the beam if the screening plate 76 moves to a B-direction. Because of this, it is possible to recognize a move position of the screening plate 76 by a level change in two levels of high and low (H/L) obtained by the light receiving element 72.

Figure 6:
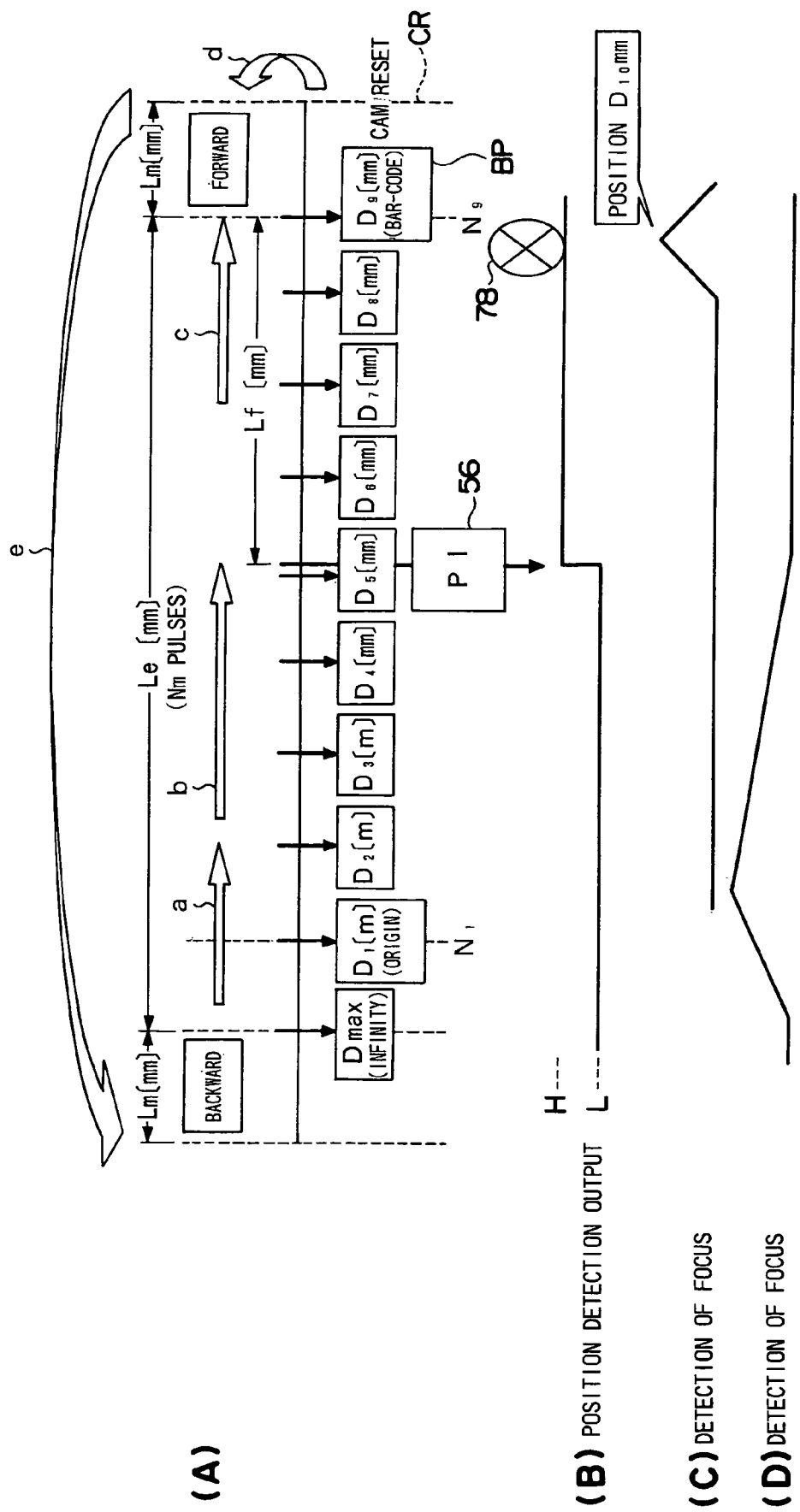
FIG. 6 is a drawing showing an outline of a control mechanism of a lens.

Next, an auto-focusing control using the AF mechanism 54 is explained by referring to FIG. 6. FIG. 6 shows the AF control, a reference letter (A) shows a moving area, a move and a move position of the lens 26, a reference letter (B) shows an output of the PI, a reference letter (C) shows a detection of a focus at the time of initial setting, and a reference letter (D) shows a detection of a focus at the time of use. In the drawing shown by the reference letter (A), arrows "a", "b", "c", "d" and "e" show a move of the lens 26.

In AF mechanism 54, movable areas Lm (mm) are set before and behind an effective moving area Le (mm) of the lens 26, respectively, and areas from $D_9$ (mm) in which focal length is a minimum, $D_8$, $D_7$, . . . to $D_{max}$ (mm) in which focal length is infinity, are set in the effective moving area Le (mm). In the case of controlling the area of this focal length by "m" steps, a moving area of the lens 26 is $N_{max}$ pulses in all, and Nm pulses out of these pulses correspond to the minimum $D_9$ through the infinity $D_{max}$. If the lens 26 is moved over this control area in the direction of infinity, a gear mechanism moving the lens 26 is damaged. In order to prevent damage like this, the control area is detected by the PI 56. In the case of controlling over the control area in a macro-direction, the lens 26 is moved mechanically in the direction of infinity. This move, for example, can be performed by using a cam reset mechanism not shown in the drawings.

As fundamental control, a stop position of the lens 26 as an example is changed by a position of the PI 56, and, for example, a focus position detection at the closest proximity position is performed by depth of field.

(1) Performance Confirmation Test of the Camera Module 52 (for Example, at the Time of Production)

Whether or not working of the stepping motor 58 and an input from the PI 56 is normal is confirmed. A position of the lens 26 is moved to a test position in order to perform a sensitivity adjustment of R (Red), G (green) and B (Blue). If a L (:Low) level output is detected from the PI 56 at the time of starting of the performance confirmation of the camera module 52, a position of the lens 26 is moved until an output of the PI 56 changes to a H (:High) level from the L level. In the case in which the output of the PI 56 does not become the H level even if the lens 26 is moved forward by the maximum $N_{max}$ pulses, a notice of a defect is performed.

Further, in the case in which the H level output is detected from the PI 56 at the time of the starting of the performance confirmation, the lens 26 is moved forward by the maximum $N_{max}$ pulses. A cam reset is performed by this move to the front, and the lens 26 is moved until the output of the PI 56 becomes the L level from the H level by moving backward (an infinity position) the lens 26. In the case in which the output of the PI 56 does not become the L level even if the lens 26 is moved forward by the maximum $N_{max}$ pulses, a notice of a defect is performed. Next, the lens 26 is moved forward by a predetermined number, 40 pulses as an example, from the cam reset (the output of the PI 56 becomes the L level from the H level). This position is set as a position of an RGB sensitivity adjustment. This position becomes a position of infinity focus.

(2) Adjustment of Position Detection of the Lens 26 (for Example, at the Time of Production)

For example, at the time of production in a factory, whether or not a reference object (a predetermined distance from a top position of the lens 26) is brought into focus is detected, and which position is a position of the PI 56 is detected from the output of the PI 56. In FIG. 6, a reference numeral 78 shows an image of the reference object, and that position is an in-focus position of the reference object. Although the PI 56 is located in a little to the infinity from a middle position of the control area, a positional gap due to dispersion of individual difference occurs by an assembling error. Because of this, as descried in the following, a position of the PI 56 is detected and that position is recorded.

In this case, if a detection of the L level output is given by the PI 56 at the time of starting of the position detecting adjustment, the lens 26 is moved forward (namely, the macro-direction) by the maximum $N_{max}$ pulses, and a detection of a change to the H level from the L level of the output of the PI 56 is performed. In the case in which the H level is detected as the output of the PI 56 at the time of starting of the position detection adjustment, the lens 26 is moved forward by a number of predetermined maximum pulses, N pulses, and the cam reset is performed by this move to the front. Then, the lens 26 is moved backward (namely, the infinity position), and, in this case, the lens 26 is moved until the output of the PI 56 changes to the L level from the H level. The lens 26 is moved forward by the predetermined number, the N pulses, from a cam reset position CR. A position at which the output of the PI 56 changes to the H level from the L level in the middle of the move is recorded by using a number of pulses. In this case, after moving forward by the predetermined number, the N pulses, the lens 26 is moved forward one pulse by one pulse until the reference object is brought into focus. At the time of the test, for example, $D_{10}$ (for example, 85 mm) for a position detection is given as chart input of the position test, measurement of a focus is performed one pulse by one pulse, and a pulse position at which a maximum value is detected is recorded. A position of the predetermined number of pulses is set to an origin, and a bar-code position ($D_9$) is calculated. A focusing process of the lens 26 uses addition information of a difference value of a contrast among pixels of a specified image area, and, in the case in which its addition value is below a predetermined value even if the lens 26 is moved, a defect display is performed on the LCD 16 as a notice of a defect due to badness of the focusing adjustment. Then, serial communication is performed.

Further, in the case in which the focus position is detected, the number pulses N representative of a distance Lf (mm) from the position of the PI 56 until the focus position is stored the storage part of the baseband processing part 8. On the other hand, in the case in which the output of the PI 56 does not change to the H level from the L level even if the lens 26 is moved forward by the predetermined pulses at the time of starting of the position detection adjustment, a decision that the PI 56 is a defect is performed, and a defect display is performed on the LCD 16 as a notice of the defect. Then, serial communication is performed.

(3) Starting of the Camera 4 (an Ordinary Mode)

In the case of using the camera 4, when the L level output of the PI 56 is detected by impressing a power source, the lens 26 is moved forward by the number of maximum pulses, the $N_{max}$ pulses, and the lens 26 is moved until the H level output of the PI 56 is obtained. After detecting a position of the PI 56, the lens 26 is moved to a designated position according to a movement from a high position to a fixed position. In the case of moving to an infinity position of a static image finder, after the lens 26 is moved backward by predetermined pulses, the lens 26 is moved forward by predetermined pulses, for example, three pulses, and the lens 26 is returned to the origin position. In this case, three pulses are set as compensation for a backlash of a moving mechanism of the lens 26, and the lens 26 is returned extra to the infinity direction by the three pulses and is positioned in the direction of the front. In the case in which the H level output of the PI 56 is obtained at the time of the impression of the power source, the cam reset is performed by moving the lens 26 forward by the number of maximum pulses, the $N_{max}$ pulses, and a change to the H level from the L level of the output of the PI 56 is detected by the lens 26 passing through the L level output of the PI 56 and being further moved. After that, the lens 26 is moved until the origin position, and, in the case in which the output level of the PI 56 dose not change to the L level even if the lens 26 is moved by the number of maximum pulses, the $N_{max}$ pulses, a decision of a defect of the PI 56 is performed and a notice of the defect is performed.

(4) Stopping of Working of the Camera 4

At the time of a stop of the camera 4, the camera 4 is stopped after moving the lens 26 from a current position to a predetermined position, and thereby the improvement of quickness of a detection of the origin is given at the time of starting of the camera 4. By processing like this, it is possible to reduce an influence due to sunlight toward the CCD 28.

(5) Focus Position

A focus position is a position shown in a table 1 in the case of the ordinary mode, and is position shown in a table 2 in the case of the close-up mode.

a) Ordinary Mode

TABLE 1

| QUANTITY OF FOWARD MOVEMENT | $R_1$ (ORIGIN) | $R_2$ [mm] | $R_3$ [mm] |
|---|---|---|---|
| THE NUMBER OF PULSES | $N_1$ | $N_2$ | $N_3$ |
| DISTANCE | $D_1$ [m] | $D_2$ [m] | $D_3$ [m] |
| FRONT SIDE | $DF_1$ [m] | $DF_2$ [m] | $DF_3$ [m] |
| BACK SIDE | $DB_1 = \infty$ | $DB_2$ [m] | $DB_3$ [m] |

In this ordinary mode, a relation of large and small in each numerical value is $R_1<R_2<R_3$, $N_1<N_2<N_3$, $D_1>D_2>D_3$, $DF_1>DF_2>DF_3$, and $\infty>DB_2>DB_3$.

In the case of switching to the ordinary mode from the close-up mode shown in a table 2, the lens 26 is moved to the position $D_1$ (the number of pulses $N_1$), and a focus detection is made easy. At the time of a darkness mode, only the origin position is set, and the AF control is not performed.

b) Close-Up Mode

TABLE 2

| QUANTITY OF FORWARD MOVEMENT | $R_4$ | $R_5$ | $R_6$ | $R_7$ | $R_8$ | $R_9$ |
|---|---|---|---|---|---|---|
| THE NUMBER OF PULSES | $N_4$ | $N_5$ | $N_6$ | $N_7$ | $N_8$ | $N_9$ |
| DISTANCE | $D_4$ | $D_5$ | $D_6$ | $D_7$ | $D_8$ | $D_9$ |
| FRONT SIDE | $DF_4$ | $DF_5$ | $DF_6$ | $DF_7$ | $DF_8$ | $DF_9$ |
| BACK SIDE | $DB_4$ | $DB_5$ | $DB_6$ | $DB_7$ | $DB_8$ | $DB_9$ |
| REMARKS | | | | | | BAR-CODE POSITION |

In this close-up mode, a relation of large and small in each numerical value is $R_4<R_5<R_6<R_7<R_8<R_9$, $N_4<N_5<N_6<N_7<N_8<N_9$, $D_4>D_5>D_6>D_7>D_8>D_9$, $DF_4>DF_5>DF_6>DF_7>DF_8>DF_9$ and $DB_4>DB_5>DB_6>DB_7>DB_8>DB_9$.

In the case of switching to the close-up mode from the ordinary mode, the lens 26 is moved to a position (the number of pulses $N_4$) of $D_4$ (m), $DF_4$ (m). At the time of the darkness mode, only the origin (distance: the position of $D_4$ (m)) is set and the AF control is not performed.

(6) Static Image Photographing Mode a) Ordinary Finder Mode

The lens 26 is fixed at the infinity position, a detection of a focus value is performed under the state of the half-push of the side key 204 assigned to a switch of the input operation part 24, and a movement of the lens 26 is executed. Each focus position is measured once by once, and the lens 26 is moved to a lens position showing a maximum value. At the time of the detection of the focus value, an automatic exposure process is stopped. In this case, a process in the following is executed. That is, the lens 26 is returned extra to the infinity direction by predetermined pulses, three pulses as an example, for the backlash of the moving mechanism and is moved forward by predetermined pulses, three pulses as an example.

In this case, the AF function is started by the half-push of the side key 204, and the AF function is started again by pressing the side key 204 over again. In the case in which the operation of the side key 204 is stopped, namely, in the case in which a user detaches the side key 204, the lens 26 is returned to the origin.

b) Close-Up Mode

In this case, the AF function is started by the half-push of the side key 204, and the AF function is started again by pressing it over again. In the case in which the side key 204 is detached, the lens 26 is returned to the origin, and the zoom setting can also be performed at the time of the close-up photographing similarly to the time of the ordinary finder.

c) Bar-Code Photographing Mode

At the time of starting, the lens 26 is fixed at a position of the closest proximity position $D_9$ (mm) and is controlled so as to switch to the position of $D_4$ (mm) by a user operation.

(7) Animation Photographing Mode

In the case of the animation photographing mode, a fixed focus at $D_1$ (mm) (the origin) is set.

Figure 7:
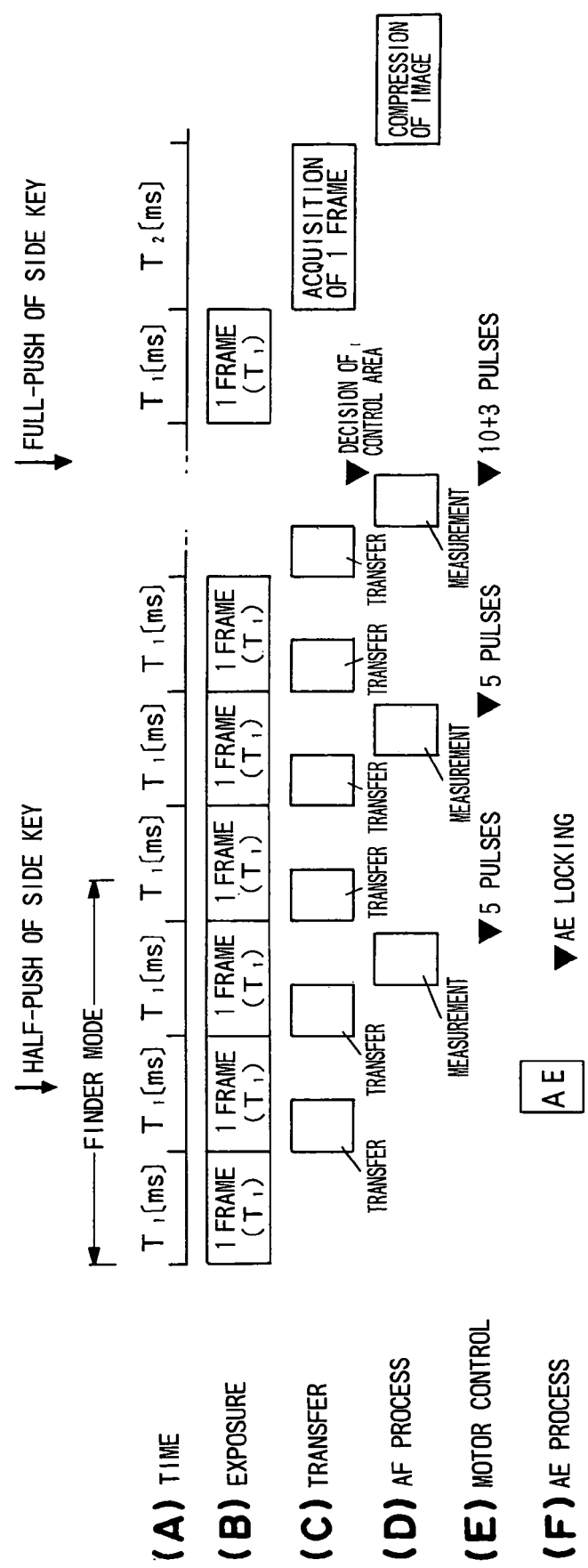
FIG. 7 is a drawing showing timing of a static image photographing mode.

Next, timing of the static image photographing mode is explained by referring to FIG. 7. FIG. 7 shows the timing of the static image photographing mode, a reference letter (A) shows lapse of time, a reference letter (B) shows an exposure, a reference letter (C) shows transfer timing, a reference letter (D) shows an AF process, a reference letter (E) shows motor control, and a reference letter (F) shows an AE process.

In the static image photographing mode, a finder mode is executed by the state of the half-push of the side key 204, and acquisition of an image is performed by the state of the full-push of the side key 204. In FIG. 7(A), "$T_1$" shows a unit of exposure time every one frame, and the exposure process is executed every one frame (FIG. 7(B)). Along with execution of this exposure process, transfer of its image is performed (FIG. 7(C)). In the AF process, as shown in FIG. 7(D), a measurement process is executed every a predetermined time, and, in this case, a control area is decided by measurement of three times. In the motor control for moving the lens 26, N pulses (for example, five pulses) are generated every the measurement process, and the number of pulses given by adding a predetermined number "n", three pulses as an example, to 2N pulses (2N+n=2N+3) is used for the motor control. Further, in the AE process, an AE mode is executed by the half-push of the side key 204, and an AE locking is executed by measurement of once. Then, by the full-push of the side key 204, one frame portion of an image is acquired, and this acquisition time is "$T_2$" ($>T_1$).

In this static image photographing mode, an AF time $AF_{NT}$ at the ordinary mode is as in the following.

$AF_{NT}$=exposure time+transfer time+motor control time

Further, an AF time $AF_{MT}$ at the close-up mode is as in the following similarly.

$AF_{MT}$=exposure time+transfer time+motor control time

A relation of large and small in AF time is $AF_{MT}>AF_{NT}$.

Figure 8:
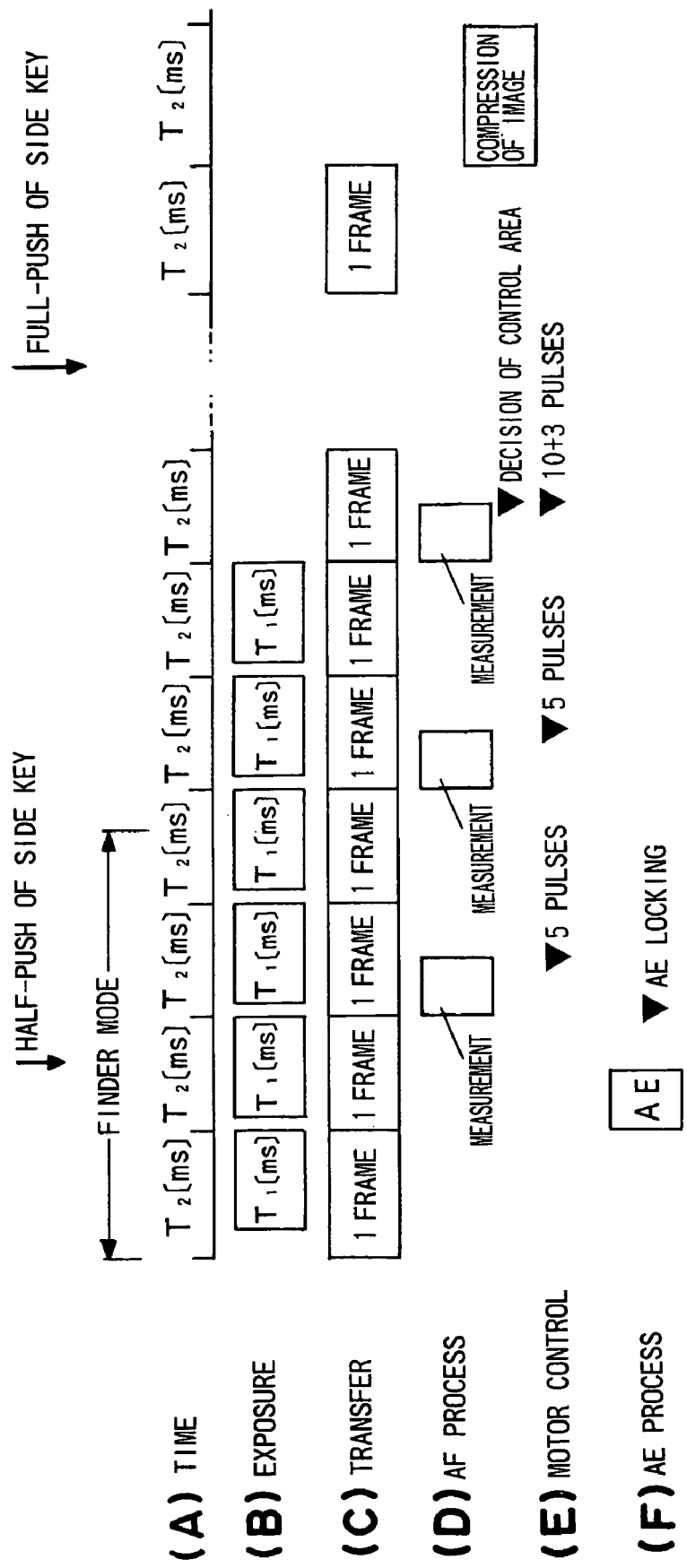
FIG. 8 is a drawing showing timing of a zoom photographing mode.

Next, timing of a zoom photographing mode is explained by referring to FIG. 8. FIG. 8 shows the timing of the zoom photographing mode, a reference letter (A) shows lapse of time, a reference letter (B) shows an exposure, a reference letter (C) shows transfer timing, a reference letter (D) shows an AF process, a reference letter (E) shows motor control, and a reference letter (F) shows an AE process. In this zoom photographing mode, as shown in FIGS. 8 (B) and (C), the transfer every one frame is performed with synchronism with an exposure.

In this zoom photographing mode, an AF time $AF_{ZT}$ is as in the following.

$AF_{ZT}$=transfer time+motor control time

Further, in the case of a dark place photographing mode, since the AF function takes time and practicality is low, a fixed focus at the origin position is set.

Figure 9:
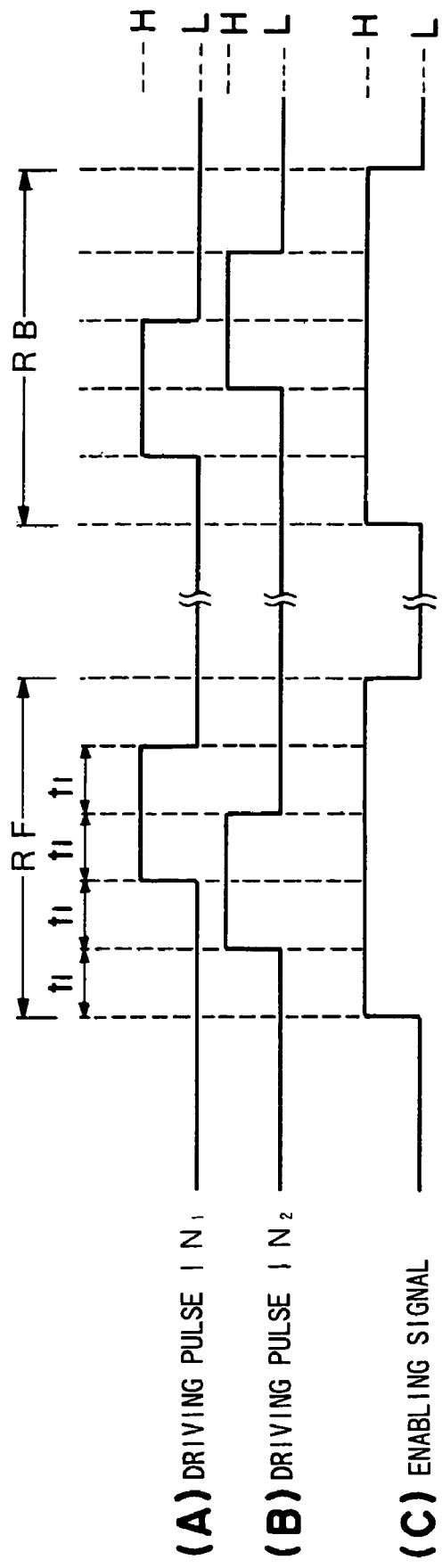
FIG. 9 is a drawing showing control signals of a stepping motor.

Next, motor control in the focusing control is explained by referring to FIG. 9. FIG. 9 shows a relation between a direction of rotation of the motor and control signals, a reference letter (A) shows a driving pulse of the A-phase side, a reference letter (B) shows a driving pulse of the B-phase side, a reference letter (C) shows an enabling signal.

In these control signals, by using a time $t_1$ as a unit, the driving pulses $IN_1$ and $IN_2$ of the A-phase and the B-phase which have pulse width of time width of $2t_1$ are used, and the enabling signal which has pulse width of time width of $5t_1$ is used. In a forward-movement period RF in which the lens 26 is moved forward, the driving pulse $IN_2$ of the B-phase side is set to a state of phase advance by the time $t_1$ within a H level period of the enabling signal. Also, in a backward-movement period RB in which the lens 26 is moved backward, the driving pulse $IN_1$ of the A-phase side is set to a state of phase advance by the time $t_1$ within the H level period of the enabling signal.

According to constitution like this, by a mutual operation of the driving pulses $IN_1$ and $IN_2$ and a combination of the enabling signal, in the forward-movement period RF the lens 26 is moved forward by driving the stepping motor 58, for example, in the direction of a regular rotation, and in the backward-movement period RB the lens 26 is moved backward by driving the stepping motor 58 in the direction of a reverse rotation. Because of this, the lens 26 can be moved to a focus position.

Figure 10:
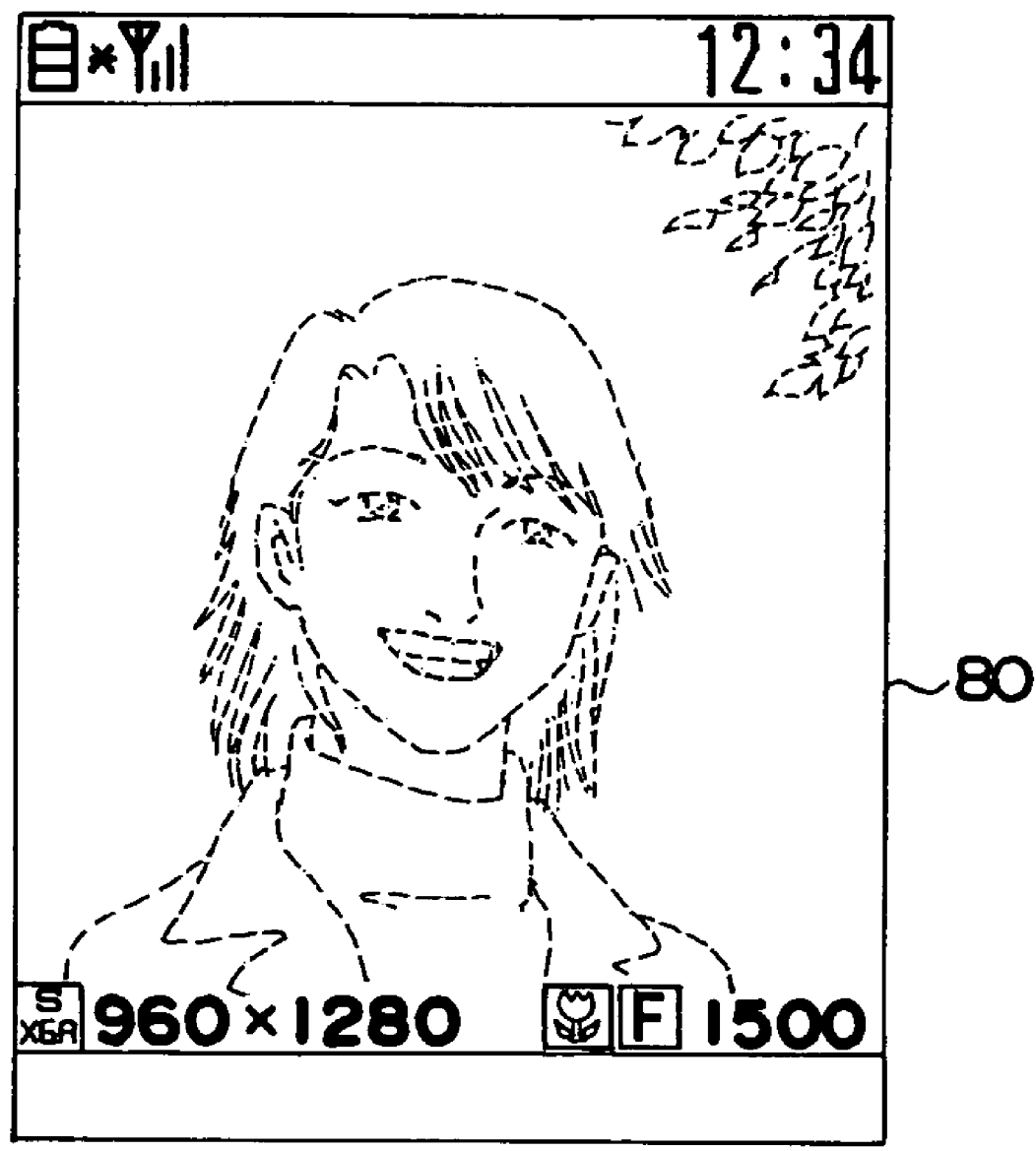
FIG. 10 is a drawing showing a finder screen of an ordinary mode.
Figure 11:
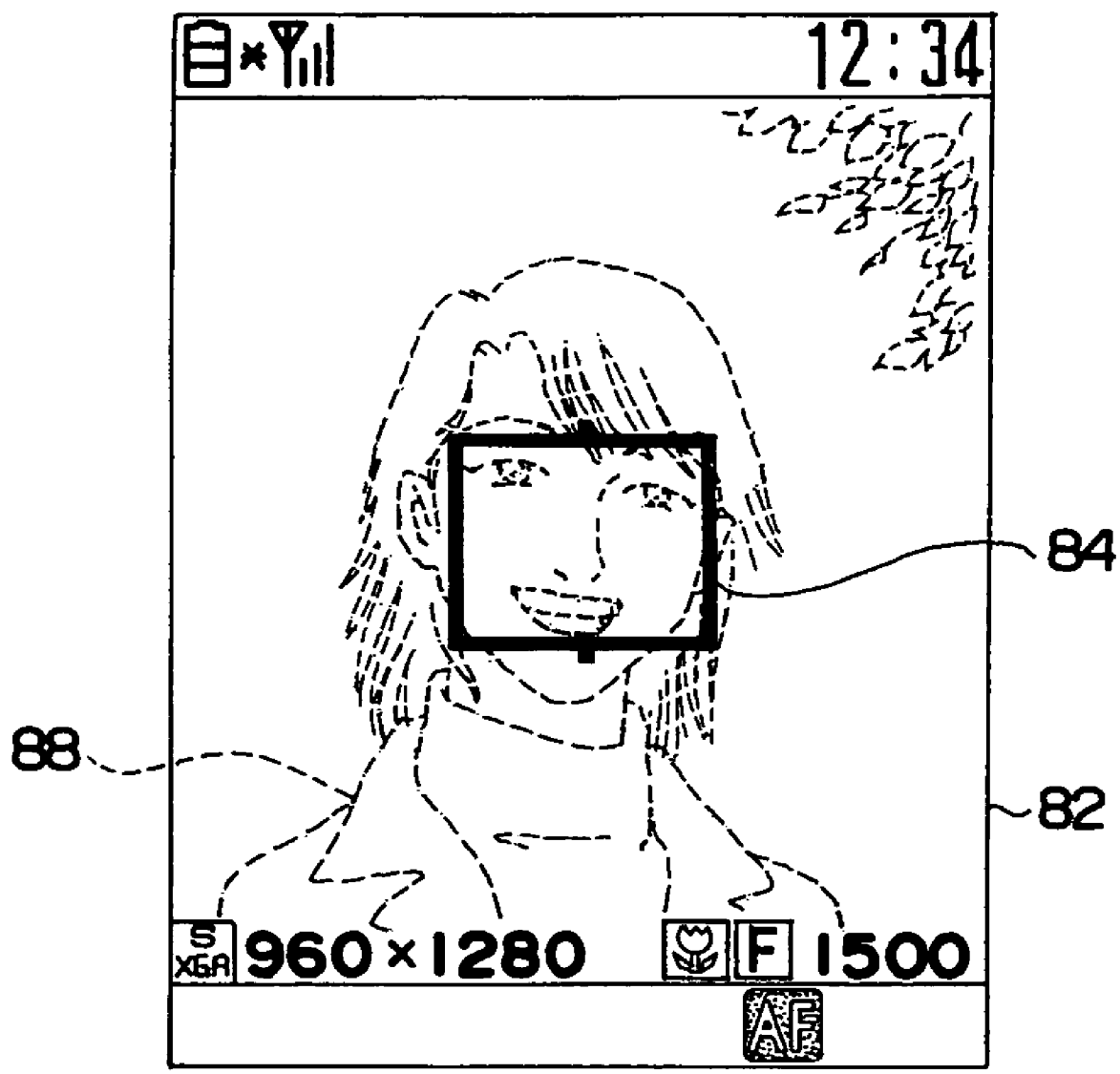
FIG. 11 is a drawing showing a finder screen under an AF (Auto-Focusing)
Figure 12:
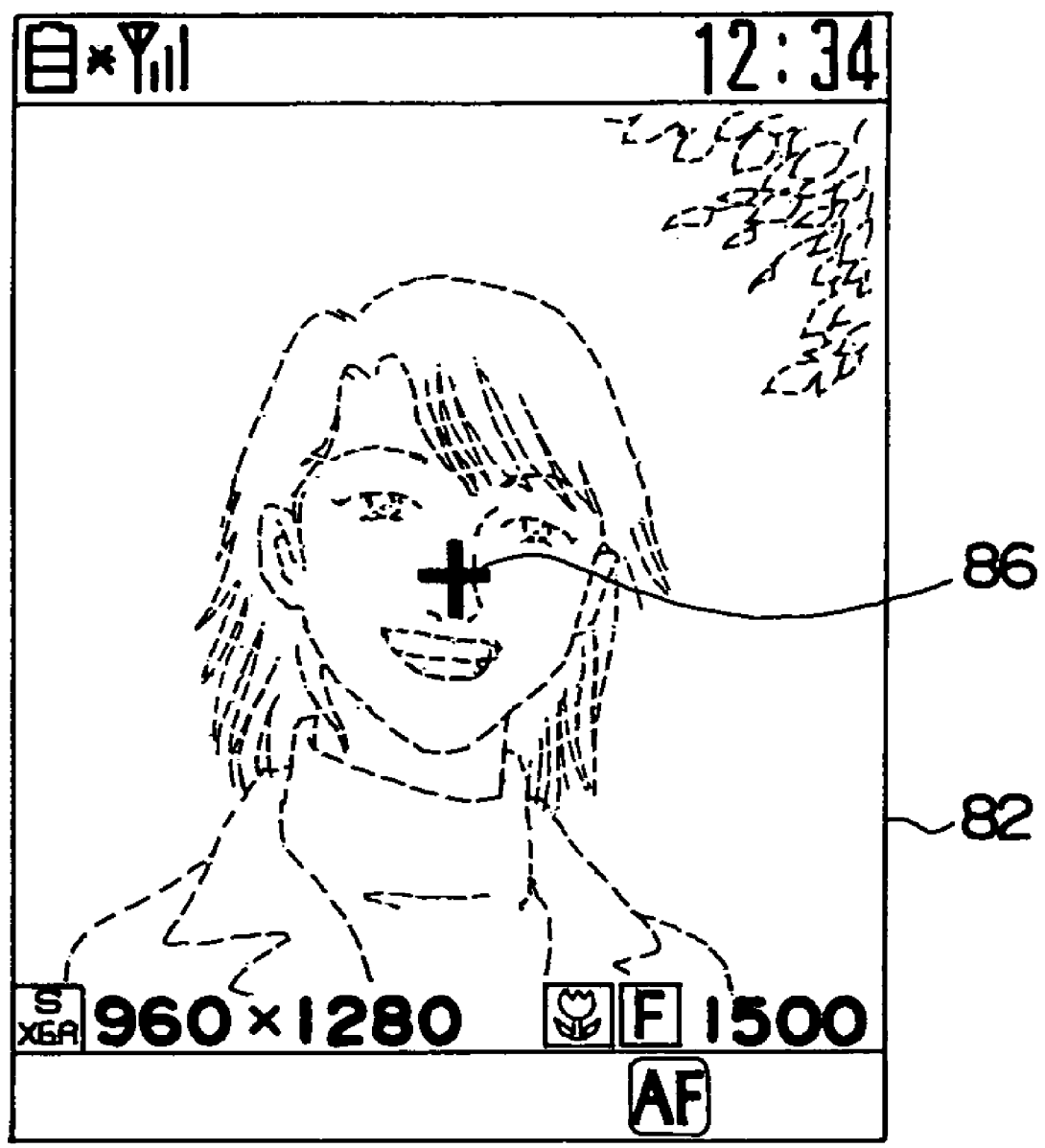
FIG. 12 is a drawing showing a finder screen at the time of a state being in focus.

Next, a finder screen displayed on the LCD 16 is explained by referring to FIG. 10 through FIG. 13. FIG. 10 shows a finder screen of the ordinary mode, FIG. 11 shows a screen in the middle of the AF, and FIG. 12 shows a screen at the time of a state being in focus.

In the ordinary mode, as shown in FIG. 10, an image which is imaged on the CCD 28 is displayed on a finder screen 80 constituted by the CCD 16. Further, if the side key 204 is maintained in a state of a half-push, as shown in FIG. 11, during the AF, a finder screen 82 in the middle of the AF is displayed on the LCD 16. In this case in the middle of the AF, an AF mark 84 representative of a state under the AF is taken from the AF processing part 68, and this AF mark 84 is composed in the finder screen 82 and is displayed. In this embodiment, a frame part 85 (FIG. 22) constituting the AF mark 84 is a rectangular, colored and transparent frame, and is displayed in a center of the finder screen 82. This AF mark 84 is displayed during the move of the lens 26, namely, while the AF action is being performed. This AF mark 84 disappears if the AF becomes a state being in focus. Then, as shown in FIG. 12, an AF in-focus mark 86 representative of the completion of focusing is taken from the AF processing part 68, and this AF in-focus mark 86 is composed in the finder screen 82 and is displayed. In this embodiment, the AF in-focus mark 86 is constituted by a colored and transparent cross shape, and is displayed in a center of the finder screen 82.

Figure 13:
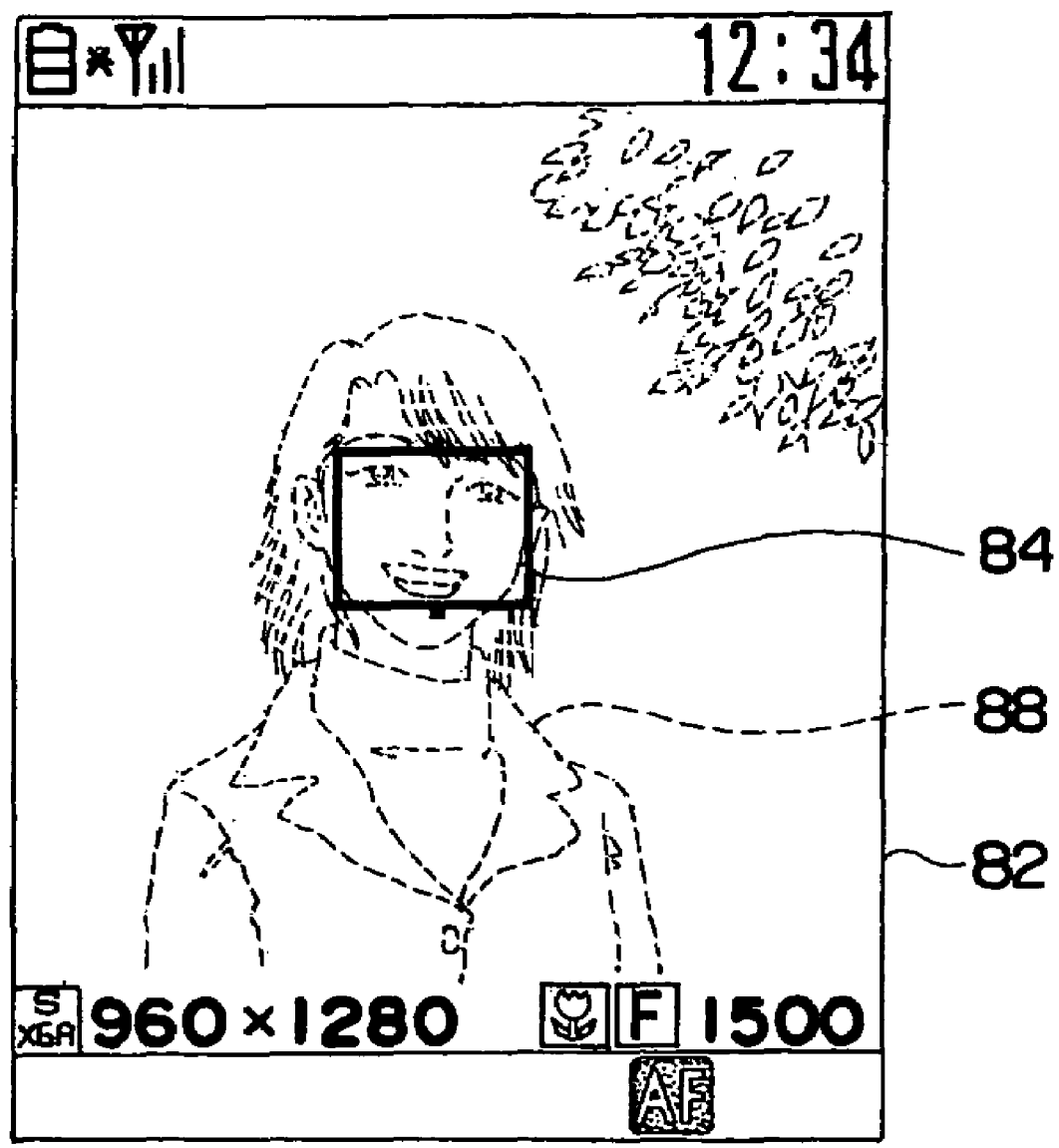
FIG. 13 is a drawing showing another finder screen under an AF.

Further, if a distance between a pictured object and the lens 26 becomes longer in the AF, a case as described in the following is expected. That is, since an expanse is given to the contents of a screen and an image 88 representative of a pictured object also becomes smaller, confirming visually which pictured object in the image is brought into focus becomes difficult. Therefore, for example, as shown in FIG. 13, the AF mark 84 is also displayed small according to a distance between a pictured object and the lens 26.

According to constitution like this, as is clear from a comparison between the finder screens 80 and 82, a difference between the ordinary finder screen and a state under the AF can be distinguished with ease by whether or not the AF mark 84 exists, and whether a current state is a state under the AF or a state of the completion of focusing can be distinguished with ease by the AF mark 84 or the AF in-focus mark 86. Further, since the size of the AF mark 84 represents a distance to a pictured object and is displayed according to an image of a pictured object under the AF, this means that depth of focus of the lens 26 is represented. Because of this, from the size of the AF mark 84, a user can recognize visually and easily a distance between the lens 26 and a pictured object and which pictured object is brought into focus. Further, the AF mark 84 can be used for modification and/or selection of a photographing area and/or size of a screen.

Figure 14:
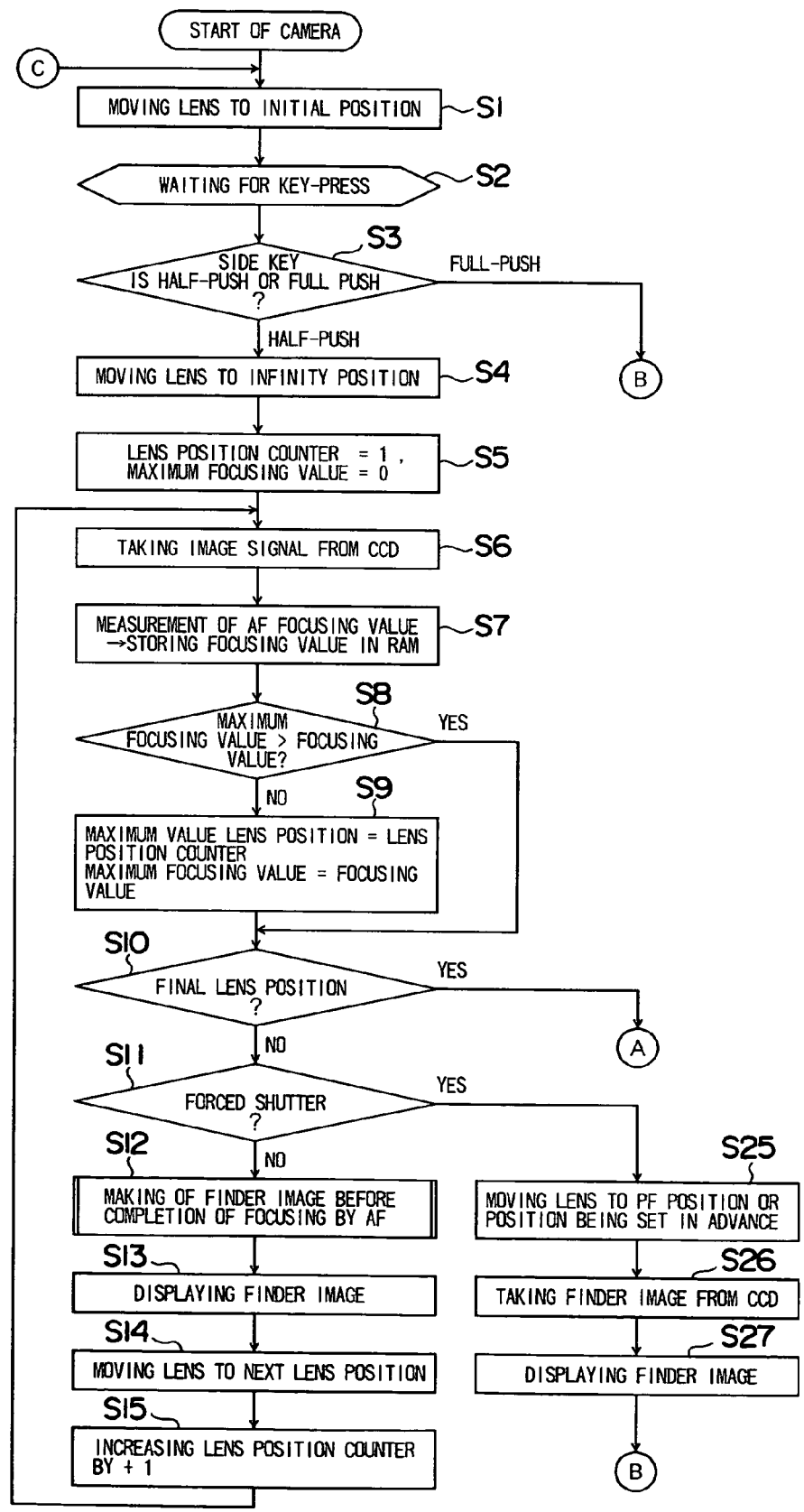
FIG. 14 is a flow diagram showing photographing control.
Figure 15:
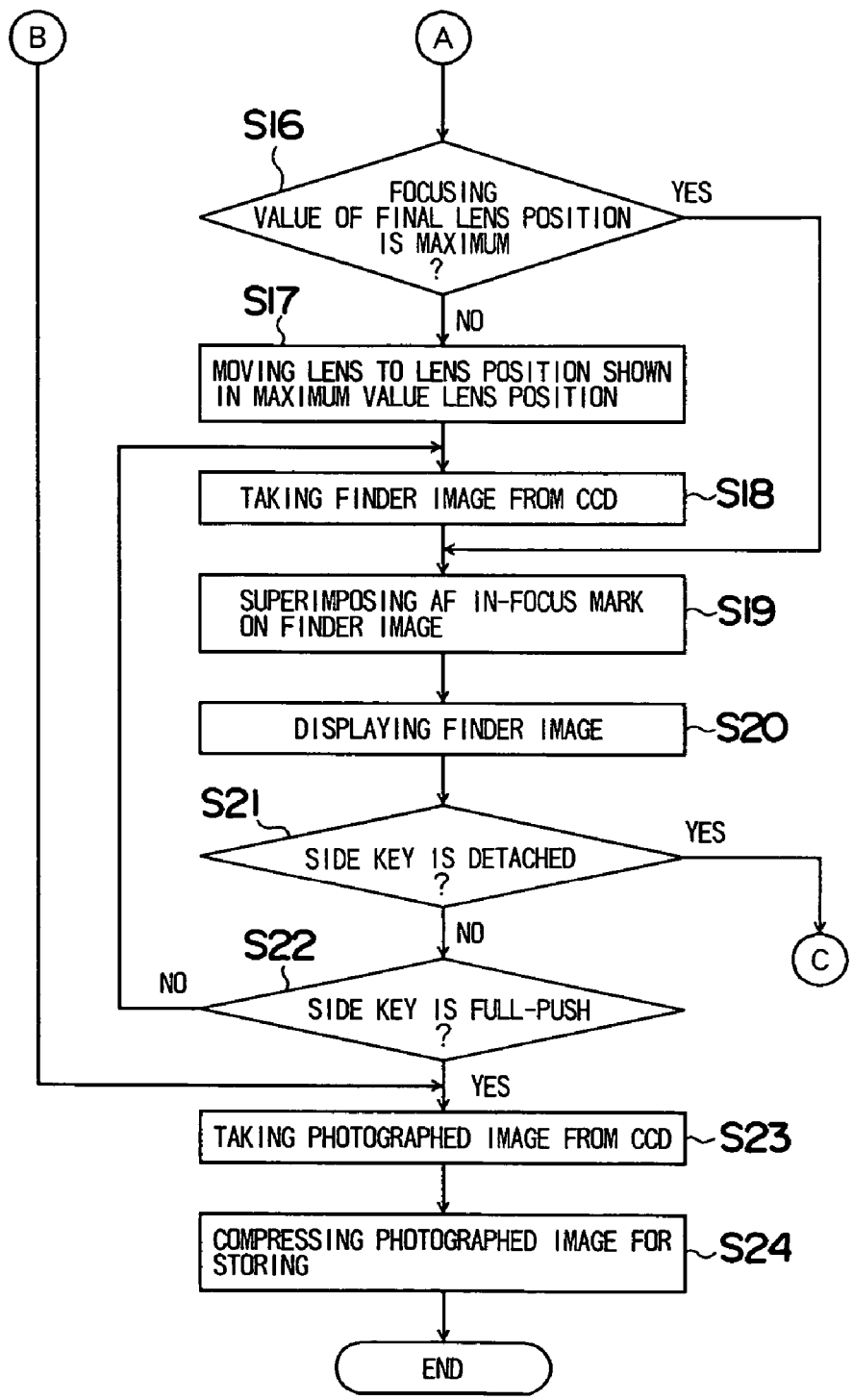
FIG. 15 is a flow diagram showing photographing control.

Next, the photographing control of the mobile terminal 2 is explained by referring to FIG. 14 and FIG. 15. FIG. 14 and FIG. 15 show the taking control of a PF image by a forced shutter process under the AF. In these drawings, reference alphabets A, B and C are connectors.

If the camera 4 is stated, a system moves the lens 26 to an initial position (a step S1). This initial position, for example, is the origin position. The system becomes a stand-by condition of a key-press under a state that the lens 26 has been moved to the initial position (a step S2), and whether the side key 204 is the state of the half-push or the state of the full-push is decided based on a detection of operation of the side key 204 serving as a shutter operation (a step S3). In the case in which the side key 204 is the state of the half-push, the AF mode is executed, and the system moves the lens 26 to a position at which a focus position becomes the infinity (a step S4). Here, the lens position counter=1 and a maximum focusing value=0 are set (a step S5). Under this state, the system takes an image signal from the CCD 28 (a step S6), performs the measurement of an AF focusing value, stores that focusing value in the RAM 20 (a step S7), and decides whether or not the focusing value is smaller than the maximum focusing value (a step S8).

In the case in which the maximum focusing value>the focusing value is not given, after changing to the maximum value lens position=the lens position counter and the maximum focusing value=the focusing value (a step S9), the system decides whether or not a final lens position is given (a step S10). In the case in which the final lens position is not given, the system decides based on a detection of the shutter operation whether or not to perform the forced shutter process (the shutter process in the middle of a focusing action) (a step S11). This forced shutter process is a process which takes an image by shifting the side key 204 to the state of the full-push from the state of the half-push during the AF. In the case in which the forced shutter process is not given, the system executes a finder image making process before the completion of focusing by the AF (a step S12), and displays a finder image based on that making (a step S13). In the case in which the maximum focusing value>the focusing value is given at the step S8, the system proceeds to the step S10 without entering the process of the step S9, and performs the processes of the steps S11 through S13.

After the display of this finder image, the system moves the lens 26 to a next lens position (a step S14), increases a counted value of the lens position counter (a step S15), and returns to the step S6. The AF process is executed by repeating the step S6 through the step S15.

Further, in the case of reaching the final lens position at the step S10, the system decides whether or not a focusing value of the final lens position is the maximum focusing value (a step S16, FIG. 15). In the case in which that focusing value is not the maximum, the system moves the lens 26 to a lens position shown by the maximum value lens position (a step S17). Under this state, the system takes the finder image from the CCD 28 (a step S18), superimposes the AF in-focus mark 86 on the finder image (a step S19), and displays the AF in-focus mark 86 together with the finder image (a step S20). In the case in which the focusing value of the final lens position is the maximum at the step S16, the system executes the processes of the steps S19 and S20 without performing the process of the step S17 through the step S18.

Under the state that this finder image is displayed, whether or not the side key 204 is detached is decided (a step S21), and, next, whether or not the side key 204 is the state of the full-push is decided (a step S22). In the case in which the side key 204 is not the state of the full-push, the system returns to the step S18. In the case in which the side key 204 is the state of the full-push, the system takes a photographed image from the CCD 28 (a step S23), a compression process is executed in order to store that photographed image (a step S24), and the system completes the photographing. Further, in the case in which the side key 204 is detached at the step S21, the system returns to the step S1, and all the processes of the step S1 through the step S21 are performed again.

Further, in the case in which the side key 204 becomes the state of the full-push from the state of the waiting of the key-press at the step S3, the system jumps to the step S23, and the taking of the photographed image is performed from the CCD 28.

Further, in the case in which the forced shutter process is performed at the step S11, namely, in the case in which the side key 204 is shifted to the state of the full-push from the state of the half-push during the AF, the system moves the lens 26 to the PF position or a position being set in advance (a step S25) without performing the process of the step S12. Under this state, the system takes a finder image from the CCD 28 (a step S26) and displays that finder image (a step S27). Further, the system proceeds to the step S23, the taking of a photographed image is performed from the CCD 28, the compression process of the photographed image is executed (the step S24), and the system completes the photographing.

According to constitution like this, in the forced shutter process, in the case in which the shutter operation is performed before the lapse of a time required for bringing into focus in the focusing mechanism 32, the taking of an image after the completion of the AF is abandoned and the AF process is shifted to the PF process. By this, for example, since an image at a focusing position of the infinity is taken, the quickness of the taking of an image which is caught by the CCD 28 is improved. Because of this, quick photographing according to a photographic scene and a state of affairs in photographing becomes possible without missing a shutter chance.

Figure 16:
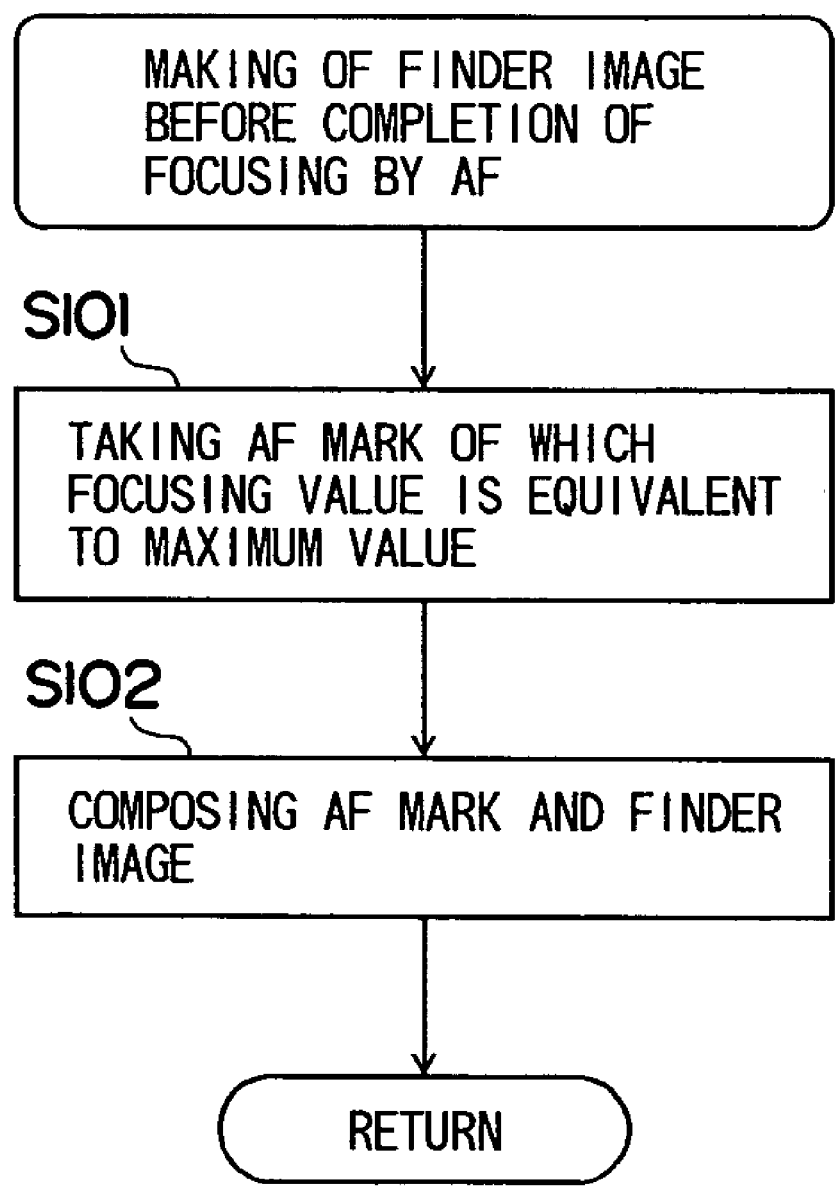
FIG. 16 is a flow diagram showing finder image control before the completion of focusing by an AF.

Next, the making of a finder image before the completion of focusing by the AF is explained by referring to FIG. 16. FIG. 16 shows the making process of a finder image before the completion of focusing by the AF.

In the making of a finder image before the completion of focusing by the AF, the system takes the AF mark 84 of which a focusing value is equivalent to the maximum value lens position (a step S101), and composes this AF mark 84 in a current finder image (a step S102). As described before, in this process, the AF mark 84 is superimposed on an object image 88 and is displayed on the finder screen 82 as shown in FIG. 11.

Second Embodiment

Figure 17:
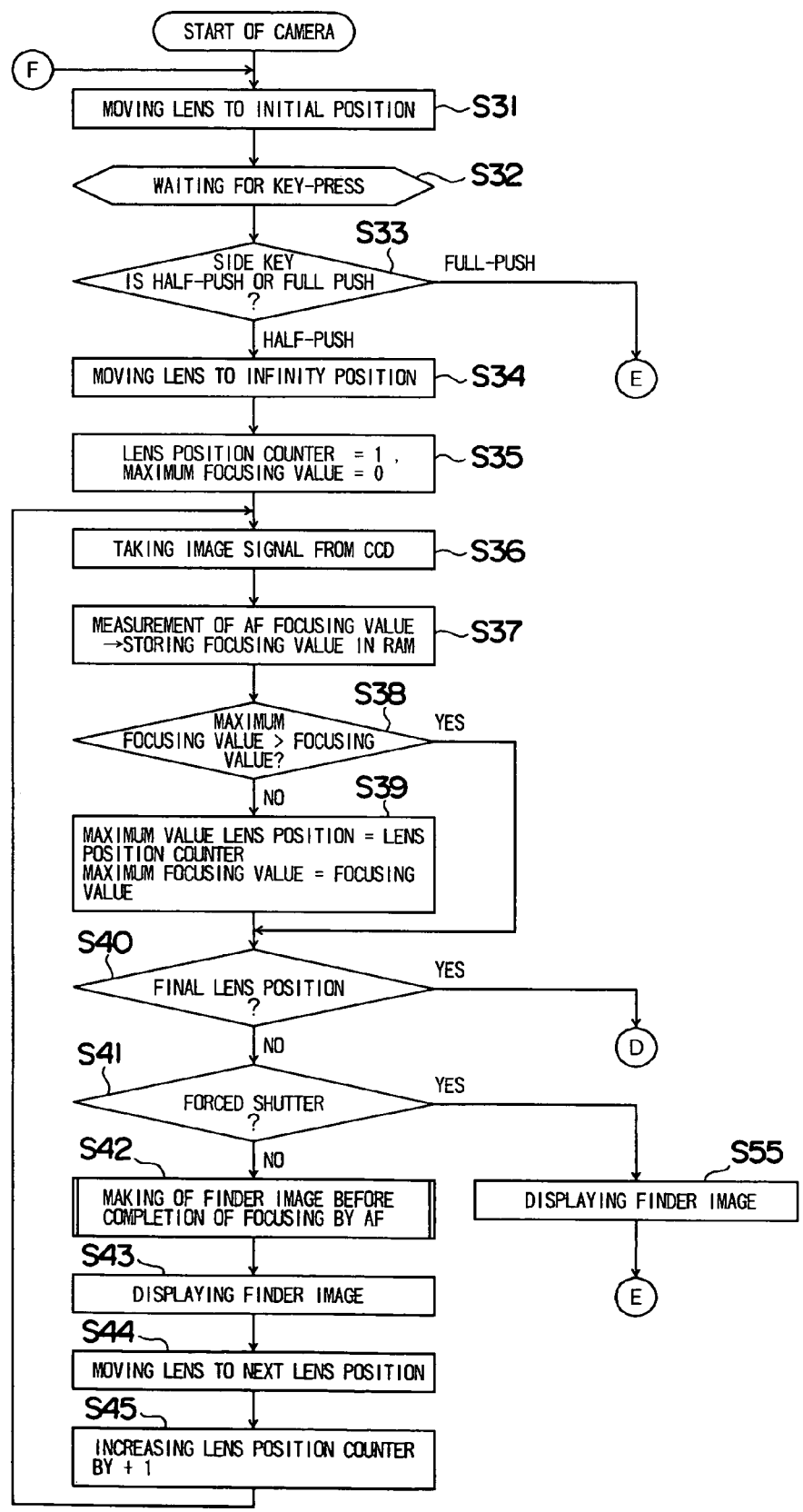
FIG. 17 is a flow diagram showing photographing control according to a second embodiment of the present invention.
Figure 18:
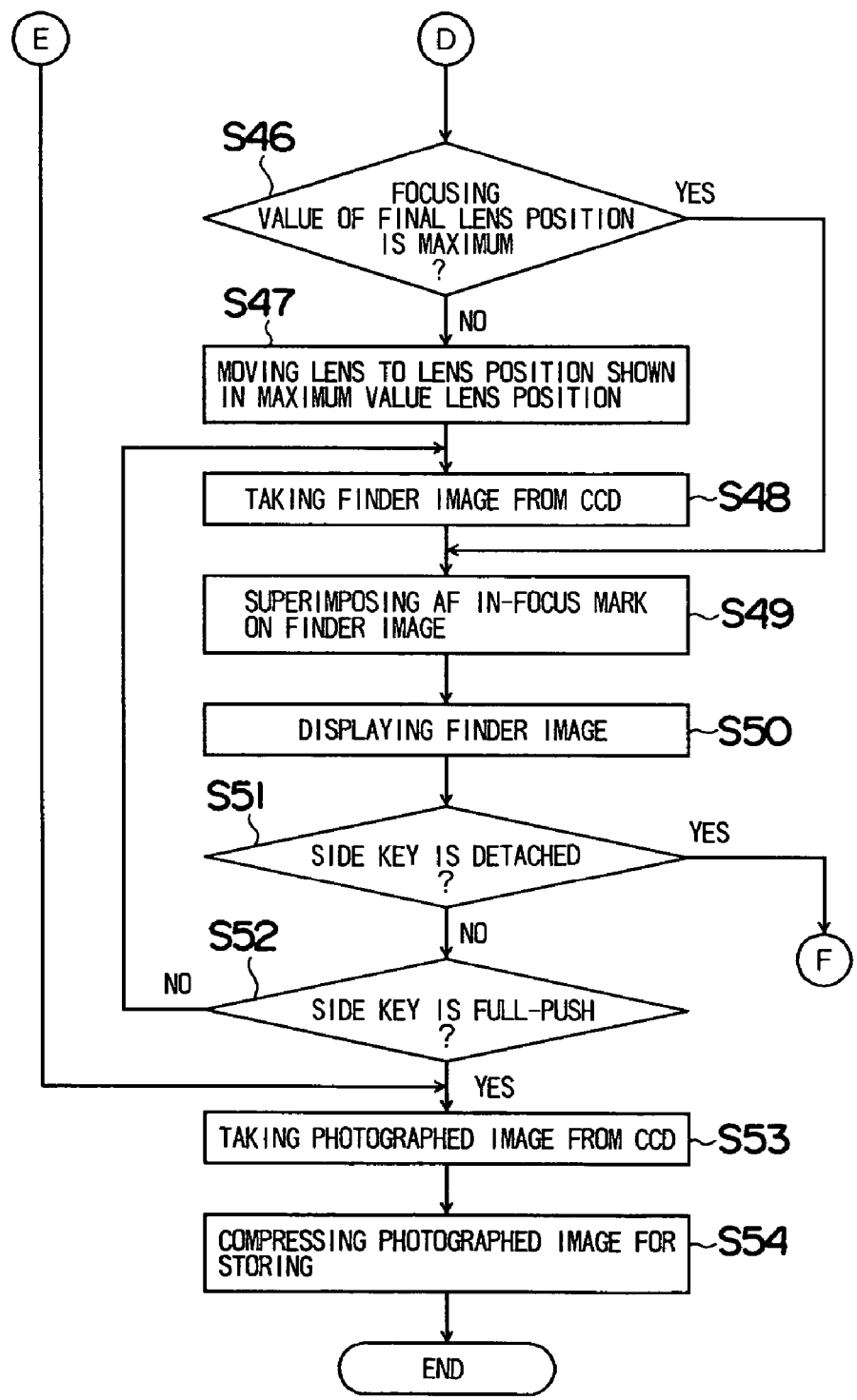
FIG. 18 is a flow diagram showing photographing control according to the second embodiment of the present invention.

Next, a second embodiment of an electronic device, a photographing control method and a photographing control program according to the present invention is explained by referring to FIG. 17 and FIG. 18. FIG. 17 and FIG. 18 show the taking control of an image in the middle of the AF by the forced shutter process under the AF. In the drawings, reference alphabets D, E and F are connectors.

This embodiment, for example, includes control described in the following as the photographing control of the photographing control part 6.

(1) An AF control by the half-push of the side key 204.

(2) Image taking control by the full-push of the side key 204 or a push of the shutter key 206.

(3) Image taking control when the side key 204 is shifted to the state of the full-push in the middle of focusing under the AF (forced shutter control).

(4) Other pieces of control.

If the camera 4 is started, the system moves the lens 26 to an initial position (a step S31). This initial position, for example, is the origin position. The system becomes a standby condition of a key-press under a state that the lens 26 has been moved to the initial position (a step S32), and whether the side key 204 is the state of the half-push or the state of the full-push is decided (a step S33). In the case in which the side key 204 is the state of the half-push, the AF mode is executed, and the system moves the lens 26 so that a focus position becomes the infinity position (a step S34). Here, the lens position counter=1 and a maximum focusing value=0 are set (a step S35). Under this state, the system takes an image signal from the CCD 28 (a step S36), performs the measurement of an AF focusing value, stores that focusing value in the RAM 20 (a step S37), and decides whether or not the focusing value is smaller than the maximum focusing value (a step S38).

In the case in which the maximum focusing value>the focusing value is not given, after changing to the maximum value lens position=the lens position counter and the maximum focusing value=the focusing value (a step S39), the system decides whether or not the lens 26 is in a final lens position (a step S40). In the case in which the lens 26 is not in the final lens position, the system decides whether or not to perform the forced shutter process (the shutter process in the middle of a focusing action) (a step S41). This forced shutter process, as described before, is a process which takes an image by shifting the side key 204 to the state of the full-push from the state of the half-push during the AF. In the case in which the forced shutter process is not given, the system executes a finder image making process before the completion of focusing by the AF (a step S42), and displays a finder image based on that making (a step S43). In the case in which the maximum focusing value>the focusing value is given at the step S38, the system proceeds to the step S40 without entering the process of the step S39, and performs the processes of the steps S41 through S43.

After the display of this finder image, the system moves the lens 26 to a next lens position (a step S44), increases a counted value of the lens position counter (a step S45), and returns to the step S36. The AF process is executed by repeating the step S36 through the step S45.

Further, in the case of reaching the final lens position at the step S40, the system decides whether or not a focusing value of the final lens position is the maximum focusing value (a step S46, FIG. 18). In the case in which that focusing value is not the maximum, the system moves the lens 26 to a lens position shown by the maximum value lens position (a step S47). Under this state, the system takes the finder image from the CCD 28 (a step S48), superimposes the AF in-focus mark 86 on the finder image (a step S49), and displays the AF in-focus mark 86 together with the finder image (a step S50). In the case in which the focusing value of the final lens position is the maximum at the step S46, the system executes the processes of the steps S49 and S50 without performing the process of the step S47 through the step S48.

Under the state that this finder image is displayed, whether or not the side key 204 is detached is decided (a step S51), and, next, whether or not the side key 204 is the state of the full-push is decided (a step S52). In the case in which the side key 204 is not the state of the full-push, the system returns to the step S48. In the case in which the side key 204 is the state of the full-push, the system takes a photographed image from the CCD 28 (a step S53), a compression process is executed in order to store that photographed image (a step S54), and the system completes the photographing. Further, in the case in which the side key 204 is detached at the step S51, the system returns to the step S31, and all the processes of the step S31 through the step S51 are performed again.

Further, in the case in which the side key 204 becomes the state of the full-push from the state of the waiting of the key-press at the step S33, the system jumps to the step S53, and the taking of the photographed image is performed from the CCD 28.

Further, in the case in which the forced shutter process is performed at the step S41, that is, in the case in which the side key 204 is shifted to the state of the full-push from the state of the half-push during the AF, the system displays the finder image (a step S55) without performing the process of the step S42. Then, the system proceeds to the step S53, the taking of a photographed image is performed from the CCD 28, the compression process of the photographed image is executed (the step S54), and the system is to complete the photographing.

According to constitution like this, in the forced shutter process, since the taking of an image after the completion of the AF is abandoned and a caught image before the completion of focusing in the middle of the AF process is taken, quick photographing according to a photographic scene and a state of affairs in photographing becomes possible without missing a shutter chance. The making of a finder image before the completion of focusing by the AF (the step S42) is the same process as the process shown in FIG. 16.

Third Embodiment

Figure 19:
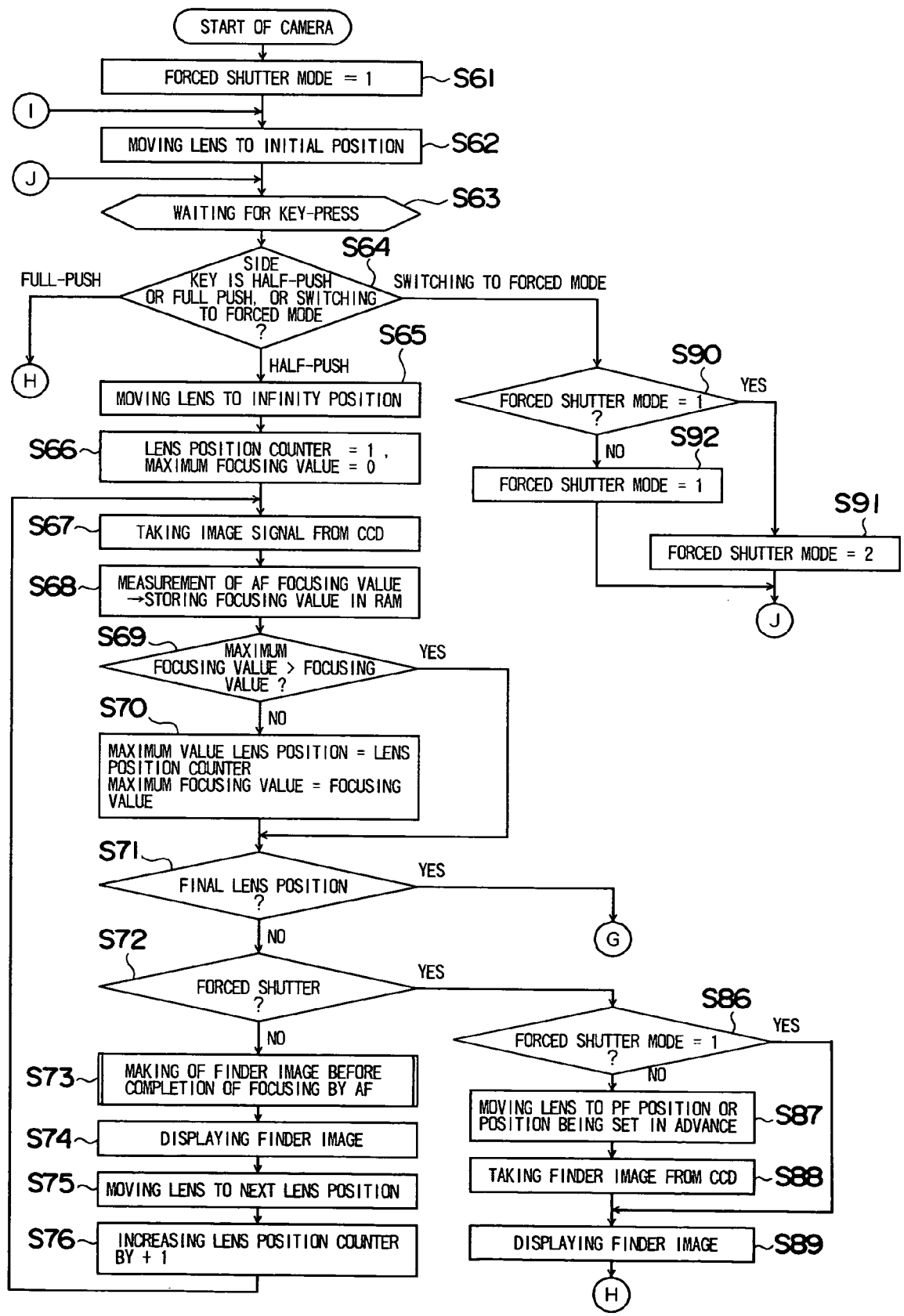
FIG. 19 is a flow diagram showing photographing control according to a third embodiment of the present invention.
Figure 20:
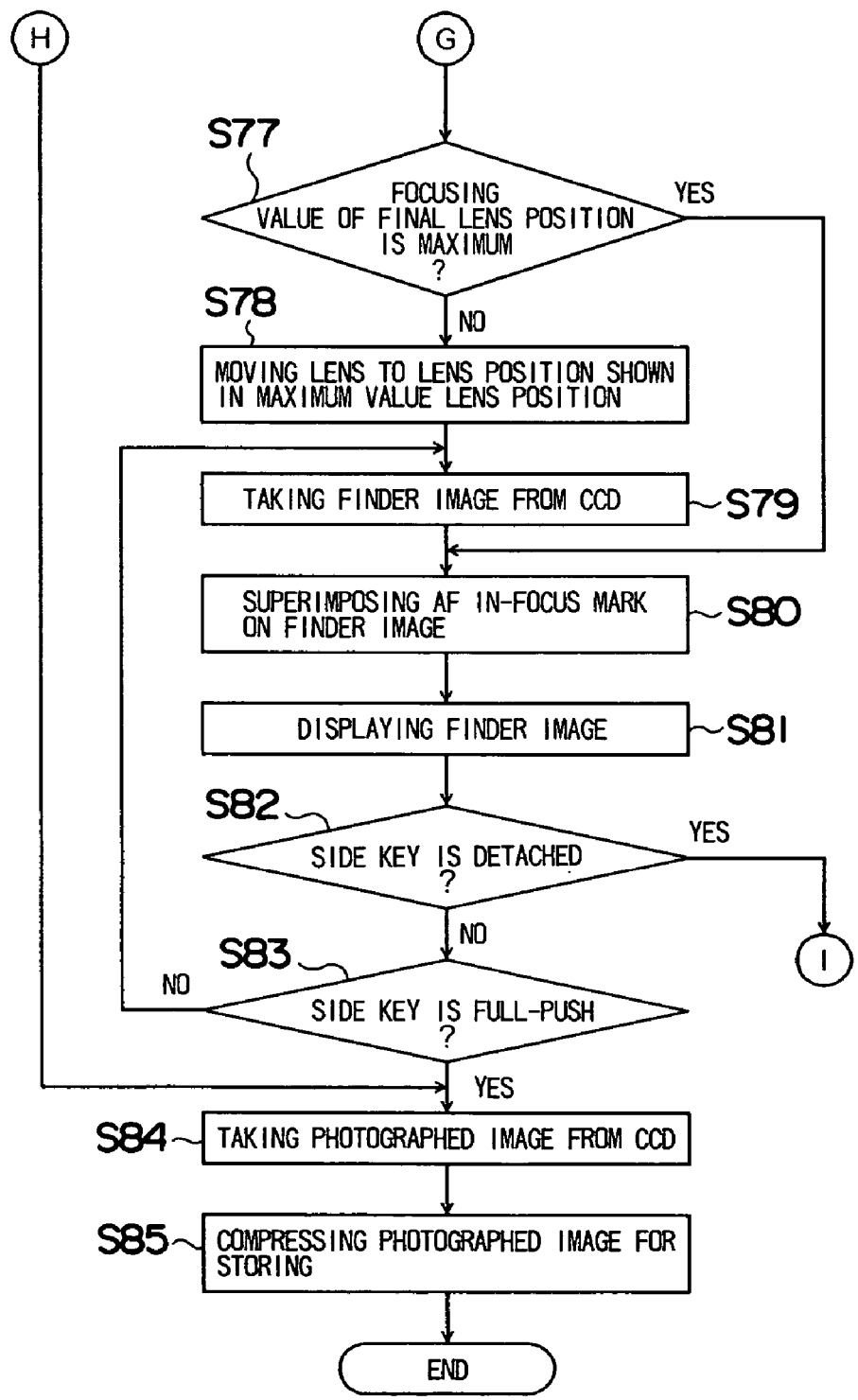
FIG. 20 is a flow diagram showing photographing control according to the third embodiment of the present invention.

Next, a third embodiment of an electronic device, a photographing control method and a photographing control program according to the present invention is explained by referring to FIG. 19 and FIG. 20. FIG. 19 and FIG. 20 show the taking control of an image in the middle of the AF by switching of the forced shutter process under the AF. In the drawings, reference alphabets G, H, I and J are connectors.

This embodiment, for example, includes control described in the following as the photographing control of the photographing control part 6.

(1) An AF control by the half-push of the side key 204.

(2) Image taking control by the full-push of the side key 204 or a push of the shutter key 206.

(3) Image taking control when the side key 204 is shifted to the state of the full-push in the middle of focusing under the AF (forced shutter control).

(4) Selecting control of a forced shutter mode executing forced shutter control.

(5) Other pieces of control.

In this embodiment, in order to obtain an opportunity of the selection control of the above item (4), a selecting function is assigned to the camera key 202 and the shutter mode selecting key 220, and a shift to the photographing mode is performed by a press of the camera key 202. Simultaneously with this, a forced shutter mode 1 is set, and a forced shutter mode 2 is set by a press of the shutter mode selecting key 220. In this case, the forced shutter mode 1 is a mode which permits the taking of an image before the completion focusing in the middle of the AF control, and the forced shutter mode 2 is a mode which takes an image of a fixed focus of the infinity by the PF control. Further, a return to the forced shutter mode 1 from this forced shutter mode 2 can be executed by the shutter mode selecting key 220 being pressed again or by the camera key 202 being pressed.

If the camera 4 is started, the forced shutter mode 1 is set (a step S61), and the system moves the lens 26 to the initial position (a step S62). A waiting state of a key-press is maintained under this state (a step S63). If a key is pressed, one of the state of the half-push of the side key 204, the state of the full-push of the side key 204 (or a push of the shutter key 206) and the switching to a forced mode is decided (a step S64). The switching to the forced mode, as described before, is a shifting process to the forced shutter mode 1 or 2 by the operation of the shutter mode selecting key 220, after the shift to the photographing mode.

In the case of the state of the half-push of the side key 204 as a result of this decision, the AF mode is executed, and the system moves the lens 26 so that a focus position becomes the infinity position (a step S65). Here, the lens position counter=1 and a maximum focusing value=0 are set (a step S66). Under this state, the system takes an image signal from the CCD 28 (a step S67), performs the measurement of an AF focusing value, stores that focusing value in the RAM 20 (a step S68), and decides whether or not the focusing value is smaller than the maximum focusing value (a step S69).

In the case in which the maximum focusing value>the focusing value is not given, after changing to the maximum value lens position=the lens position counter and the maximum focusing value=the focusing value (a step S70), the system decides whether or not a final lens position is given (a step S71). In the case in which the final lens position is not given, the system decides whether or not to perform the forced shutter process (the shutter process in the middle of a focusing action) (a step S72). This forced shutter process, as described before, is a process which takes an image by shifting the side key 204 to the state of the full-push from the state of the half-push during the AF. In the case in which the forced shutter process is not given, the system executes a finder image making process before the completion of focusing by the AF (a step S73), and displays a finder image based on that making (a step S74).

After the display of this finder image, the system moves the lens 26 to a next lens position (a step S75), increases a counted value of the lens position counter (a step S76), and returns to the step S67. The AF process is executed by repeating the step S67 through the step S76. In this case, in the case in which the maximum focusing value>the focusing value is given at the step S69, the system proceeds to the step S71 without performing the process of the step S70.

In the case of reaching the final lens position at the step S71, the system decides whether or not a focusing value of the final lens position is the maximum focusing value (a step S77). In the case in which that focusing value is not the maximum, the system moves the lens 26 to a lens position shown by the maximum value lens position (a step S78). Under this state, the system takes the finder image from the CCD 28 (a step S79), superimposes the AF in-focus mark 86 on the finder image (a step S80), and displays the AF in-focus mark 86 together with the finder image (a step S81). In the case in which the focusing value of the final lens position is the maximum at the step S77, the system executes the processes of the steps S80 and S81 without performing the process of the step S78 and the step S79.

Further, under the state that this finder image is displayed, whether or not the side key 204 is detached is decided (a step S82), and, next, whether or not the side key 204 is the state of the full-push is decided (a step S83). In the case in which the side key 204 is not the state of the full-push, the system returns to the step S79. In the case in which the side key 204 is the state of the full-push, the system takes a photographed image from the CCD 28 (a step S84), a compression process is executed in order to store that photographed image (a step S85), and the system completes the photographing. Further, in the case in which the side key 204 is detached at the step S82, the system returns to the step S62, and all the processes of the step S62 through the step S85 are to be performed again.

In the case of the forced shutter process at the step S72, the system decides whether or not a mode is the forced shutter mode 1 (namely, a decision of whether a mode is the forced shutter mode 1 or 2) (a step S86). In the case of the forced shutter mode 2, the system moves the lens 26 to the PF position or a position which is set in advance (a step S87). Under this state, the system takes a finder image from the CCD 28 (a step S88), and displays that finder image (a step S89). After that, the system proceeds to the step S84 (FIG. 20), takes a photographed image from the CCD 28, executes the compression process of the photographed image (the step S85), and completes the photographing.

Further, in the case in which the side key 204 is the state of the full-push at the step S64, the system proceeds to the step S84 and takes a photographed image from the CCD 28. Then, the compression process is executed in order to store that image (the step S85), and the system is to complete the photographing.

Further, in the case in which the decision of the switching to the forced mode is given at the step S64, the system decides whether or not a mode is the forced shutter mode 1 (a step S90). On the basis of the press of the shutter mode selecting key 220 or the press of the camera key 202 which is being operated, the system switches to the forced shutter mode 2 in the case in which the forced shutter mode 1 is set (a step S91), switches to the forced shutter mode 1 in the case in which the forced shutter mode 1 is not set (a step S92), and returns to the step S63.

In this embodiment as well, the making process of a finder image before the completion of focusing by the AF at the step S73 is executed by the processing shown in the flow diagram of FIG. 16 described before.

Fourth Embodiment

Figure 21:
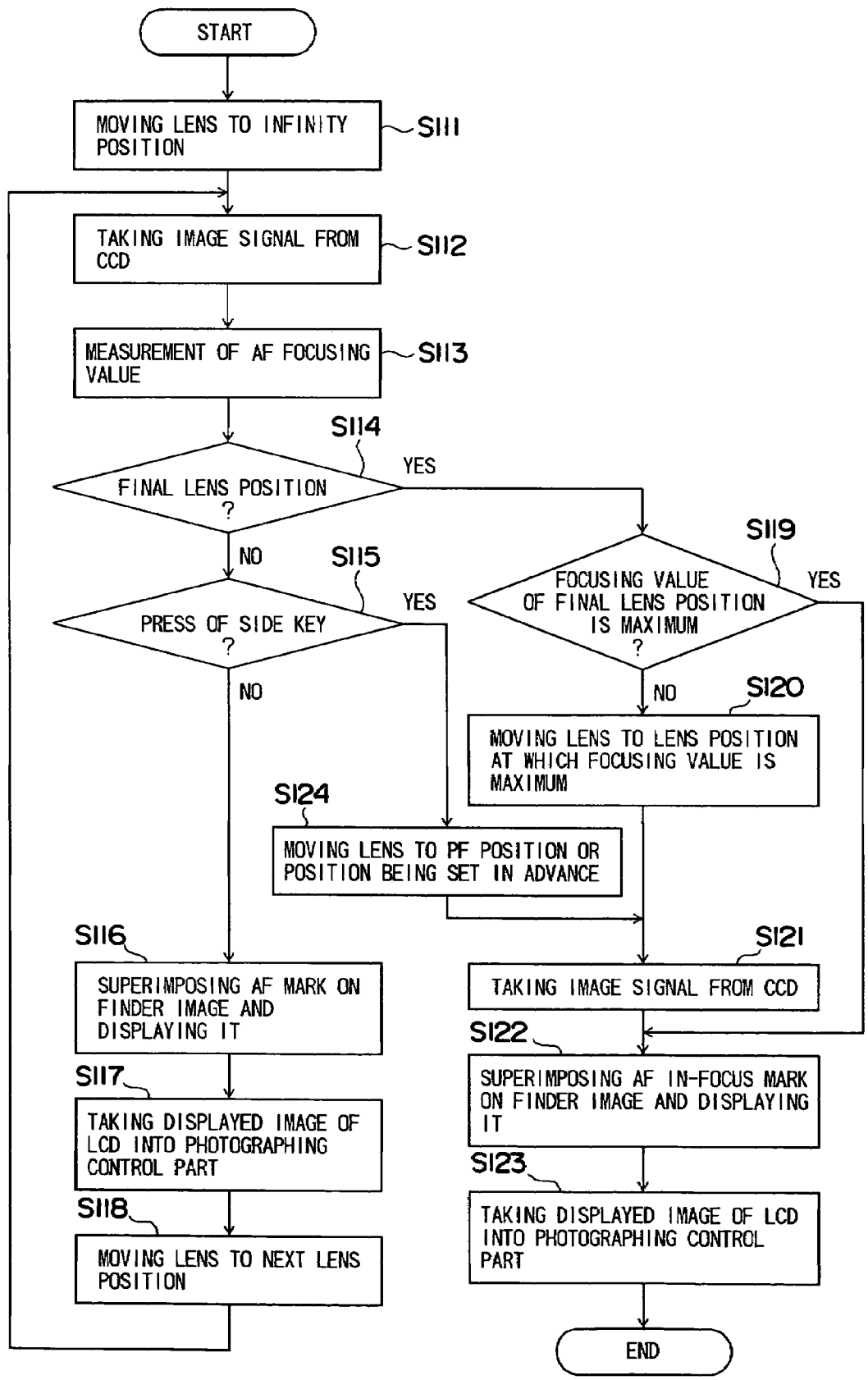
FIG. 21 is a flow diagram showing photographing control according to a fourth embodiment of the present invention.

Next, a fourth embodiment of an electronic device, a photographing control method thereof and a photographing control program thereof according to the present invention is explained by referring to FIG. 21. FIG. 21 shows about taking control of an image in the case of executing the AF process simultaneously with a shift to the photographing mode.

This embodiment, for example, includes control described in the following as the photographing control.

(1) A focusing process shifting to the AF mode in response to a press of the camera key 202, as the photographing control of the photographing control part 6.

(2) A taking process of an in-focus image (an image brought into focus) by the full-push of the side key 204.

(3) A taking process of a PF image by the full-push of the side key 204 in the middle of focusing under the AF.

If the camera 4 is started, a system shifts to the AF control automatically, moves the lens 26 to the infinity position (a step S111), takes an image signal from the CCD 28 through the lens 26 (a step S112), and performs measurement of an AF focusing value from this image which is taken (a step S113). The system decides based on this measurement whether or not a position of the lens 26 is the final lens position (a step S114). In the case in which the lens position is not the final lens position, the system decides whether or not the side key 204 is pressed under this state (a step S115). In the case in which the side key 204 is not the state of the full-push, the system continues the AF process, and superimpose the AF mark 84 on the finder image before the completion of focusing by the AF and displays it (a step S116). After that, the system takes the image (the finder image), which is caught by the CCD 28 and is displayed on the LCD 16, into the photographing control part 6 (a step S117), and moves the lens 26 to a next lens position (a step S118). In this case, as shown in FIG. 6, for example, the lens position is moved to the position $D_1$ through $D_4$ from the infinity $D_{max}$.

In the case in which the lens position reaches the final lens position at the step S114, the system decides whether or not a focusing value at the final lens position is a maximum (a steps S119). In the case in which the focusing value is not the maximum, the system moves the lens 26 so that the focusing value becomes the maximum (a step S120) After that, the system takes an image, which is imaged on the CCD 28 by the lens 26 after being moved, from the CCD 28 (a step S121), and superimposes the AF in-focus mark 86 on the finder image and displays it (a step S122). By this, a state being in focus is notified by the AF in-focus mark 86. Along with this, the system takes the image (the finder image), which is caught by the CCD 28 and is displayed on the LCD 16, into the AF processing part 68 of the photographing control part 6, and completes the photographing. In the case in which the focusing value of the final lens position is the maximum at the step S119, the system proceeds to the step S122 without performing the processes the steps S120 and S121, performs the same processing, and completes the photographing.

Further, in the case in which the side key 204 is the state of the full-push at the step S115, the system moves forcedly the lens 26 to the PF position or a position being set in advance (a step S124), proceeds to the step S121, executes the processes after the step S121, and completes the photographing.

Next, other embodiments are enumerated in the following and are explained.

Figure 22:
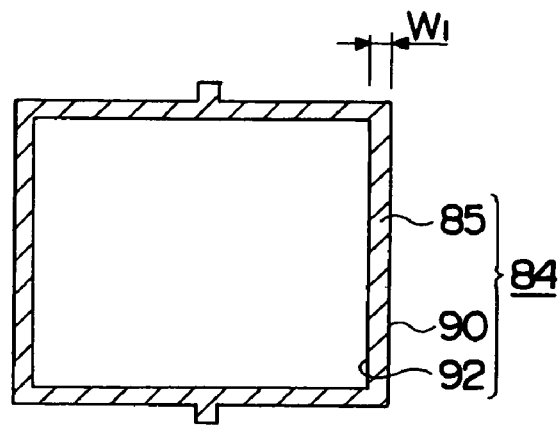
FIG. 22 is a drawing showing an AF mark according to another embodiment.
Figure 22:
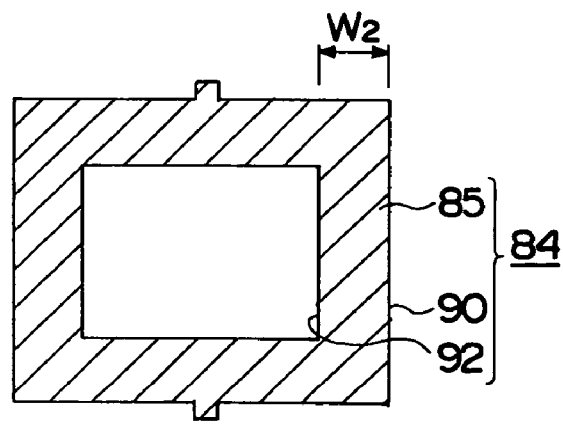
Figure 22:
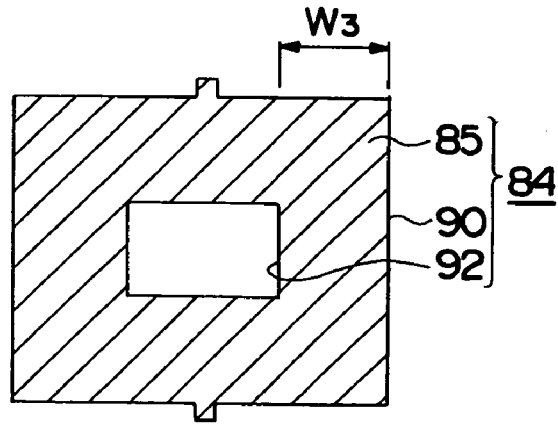

(1) In the examples shown in FIG. 11 and FIG. 13 in respect to the AF mark 84, the size of the AF mark 84 is changed according to a focus distance between the camera 4 and a pictured object, and depth of focus. However, for example, as shown in FIG. 22, the size of an outer contour part 90 of the AF mark 84 is fixed, and the size of its inner contour part 90 may also be changed. That is, width of the frame part 85 of the AF mark 84 may also be changed continuously or gradually according to a distance so as to give width $W_1$, $W_2$ or $W_3$ ($W_1 < W_2 < W_3$). In this case, FIG. 22(A) represents short distance photographing, FIG. 22(B) represents middle distance photographing, and FIG. 22(C) represents long distance photographing. In this case, the frame part 85 is shown by a colored and transparent display so as not to be an obstacle to an image, and thereby the recognition of a displayed image is made possible through the frame part 85. By the AF mark 84 mentioned above being displayed on an image in layers, the confirmation of a pictured object brought into focus becomes easy. Further, the AF mark 84 can be used for a change and/or selection of a photographing area and/or screen size.

(2) In connection with the AF mark 84, the frame part 85 is displayed by color during the focusing action, and its color may also be changed before and after the completion of focusing. For example, if it is displayed by white before the completion of focusing and it is displayed by green after the completion of focusing, a user can recognize before and after the completion of focusing by a change in color with ease.

(3) Although in the embodiments the mobile terminals 2 is illustrated as an electronic device, the present invention can also be applied to a digital camera, a PDA (Personal Digital Assistant), many kinds of electronic devices of a mobile personal computer and so on, and photographing control thereof. That is, the present invention is not limited to the mobile terminal 2 in the embodiments.

(4) In the photographing control shown in FIG. 14 through FIG. 21, the forced shutter process is executed in the case in which the side key 204 is shifted to the state of the full-push before the completion of focusing under the AF. However, in connection with a shifting process to this shutter process, the present invention may also be constituted so that the AF processing part 68 executes a comparison between the time "tf" required for bringing into focus in the focusing mechanism 32 and the time "ts" from starting of focusing by the half-push of the side key 204 until a shift to the state of the full-push, namely the time to the start of a shutter operation, and so that a process changing the lens 26 to the PF position from the AF position is executed on the basis of the comparison result. The time "tf" is an already-known information decided by the camera module 52, and the time "ts" is given by measuring a time from starting of the half-push of the side key 204 to full-push.

Although the best mode for carrying out the invention, the object, the configuration and the operation and effect have been described in detail above, the invention is not limited to such embodiment for carrying out the invention, and it is a matter of course that the invention can be variously changed or modified by a person skilled in the art on the basis of a gist and split of the invention as disclosed in claims and the detailed description of the invention, and such a change or modification, and various conjectured configurations, modified examples and so forth are included in the scope of the invention, and the description of the specification and drawings are not restrictively understood.

The entire disclosure of Japanese Patent Application No. 2003-384728 including specification, claims, drawings and summary are incorporated herein by reference in its entirety.

What is claimed is:

1. An electronic device having an optical system for capturing an image comprising:
   a focusing mechanism for moving said optical system to an auto-focusing position or a fixed focus position;
   a switch that functions as a focusing switch and also functions as a shutter switch, wherein said switch when operated orders a focusing action or orders capturing of the image; and
   a controller that decides whether the optical system is in a final lens position or not during a focusing action of said focusing mechanism due to said switch, and in the case where a shutter operation of said switch is performed under a state that the optical system is not in the final lens position, shifts said optical system to a fixed focus position from an auto-focusing position and takes a fixed focus image,
      wherein, during the focusing action, a focusing value is measured with an origin at a lens position where a focus position becomes an infinity, and if the measured focusing value is not smaller than a maximum focusing value, the decision is performed with making the measured focusing value into the maximum focusing value, and
   wherein said controller compares between a time required for bringing into focus in said focusing mechanism and a time from starting of the focusing action until starting of said shutter operation, and changes said optical system to said auto-focusing position or said fixed focus position based on a result of the comparison.

2. The electronic device of claim 1, wherein said switch is provided as a first switch, and a switch which is used in photographing by a fixed focus is also provided as a second switch separated from the first switch.

3. The electronic device of claim 1, wherein said switch functions as said focusing switch at a state of a half-push and functions as said shutter switch at a state of a full-push.

4. The electronic device of claim 1 further comprising:
   a first housing part that has said optical system;
   a second housing part that has said switch; and
   a coupling part that couples said first housing part and said second housing part so that the first and second housing parts can be folded up.

5. An electronic device having an optical system for capturing an image comprising:
   a focusing mechanism for moving said optical system to an auto-focusing position or a fixed focus position;
   a switch that functions as a focusing switch and also functions as a shutter switch, wherein said switch when operated orders a focusing action or orders capturing of the image; and
   a controller that decides whether the optical system is in a final lens position or not during a focusing action of said focusing mechanism due to said switch, and in the case where a shutter operation of said switch is performed under a state that the optical system is not in the final lens position, shifts said optical system to a fixed focus position from an auto-focusing position and takes a fixed focus image,
   wherein said controller compares between a time required for bringing into focus in said focusing mechanism and a time from starting of the focusing action until starting of said shutter operation, and changes said optical system to said auto-focusing position or said fixed focus position based on a result of the comparison.

6. An electronic device having an optical system for capturing an image comprising:
   a focusing mechanism for moving said optical system to an auto-focusing position or a fixed focus position;
   a switch that functions as a focusing switch and also functions as a shutter switch, wherein said switch according to a condition of operation orders a focusing action or the capturing of the image; and
   a controller that decides whether the optical system is in a final lens position or not during a focusing action of said focusing mechanism due to said switch, and in the case where a shutter operation of said switch is performed under a state that the optical system is not in the final lens position, takes an image at a focus position in the middle of the focusing action,
      wherein, during the focusing action, a focusing value is measured with an origin at a lens position where a focus position becomes an infinity, and if the measured focusing value is not smaller than a maximum focusing value, the decision is performed with making the measured focusing value into the maximum focusing value, and
   wherein said controller compares between a time required for bringing into focus in said focusing mechanism and a time from starting of the focusing action until starting of said shutter operation, and changes said optical system to said auto-focusing position or said fixed focus position based on a result of the comparison.

7. The electronic device of claim 6, wherein said switch is provided as a first switch, and a switch which is used in photographing by a fixed focus is also provided as a second switch separated from the first switch.

8. The electronic device of claim 6, wherein said switch functions as said focusing switch at a state of a half-push and functions as said shutter switch at a state of a full-push.

9. The electronic device of claim 6 further comprising:
a first housing part that has said optical system;
a second housing part that has said switch; and
a coupling part that couples said first housing part and said second housing part so that the first and second housing parts can be folded up.

10. A photographing control method of an electronic device having an imaging part which catches an image obtained through an optical system, and a focusing mechanism which moves said optical system to an auto-focusing position or a fixed focus position, comprising:
a process that detects a shutter operation in the middle of a focusing action of said focusing mechanism;
a process that measures a focusing value with an origin at a lens position where a focus position becomes an infinity, during the focusing action;
a process that makes the measured focusing value into a maximum focusing value if the measured focusing value is not smaller than a maximum focusing value;
a process that decides whether the optical system is in a final lens position or not during a focusing action of the focusing mechanism;
a process that detects said shutter operation and, if the optical system is not in the final lens position, switches to said fixed focus position from said auto-focusing position of said optical system under the focusing action;
a process that compares between a time required for bringing into focus in said focusing mechanism and a time from starting of the focusing action until starting of said shutter operation, and changes said optical system to said auto-focusing position or said fixed focus position based on a result of the comparison; and
a process that takes a fixed focus image caught at said fixed focus.

11. The photographing control method of the electronic device of claim 10 further including a process that superimposes a focusing mark representative of a distance between a pictured object and the optical system on an image, in the middle of said focusing action, which is caught by said imaging part, and displays it.

12. A photographing control method of an electronic device having an imaging part which catches an image obtained through an optical system, and a focusing mechanism which moves said optical system to an auto-focusing position or a fixed focus position, comprising:
a process that detects a shutter operation in the middle of a focusing action of said focusing mechanism;
a process that measures a focusing value with an origin at a lens position where a focus position becomes an infinity, during the focusing action;
a process that makes the measured focusing value into a maximum focusing value if the measured focusing value is not smaller than a maximum focusing value;
a process that decides whether the optical system is in a final lens position or not during a focusing action of the focusing mechanism;
a process that detects said shutter operation and, if the optical system is not in the final lens position, takes an auto-focusing image caught by said imaging part in the middle of the focusing action; and
a process that compares between a time required for bringing into focus in said focusing mechanism and a time from starting of the focusing action until starting of said shutter operation, and changes said optical system to said auto-focusing position or said fixed focus position based on a result of the comparison.

13. A computer readable recording medium storing a photographing control program of an electronic device having an imaging part which catches an image obtained through an optical system, and a focusing mechanism which moves said optical system to an auto-focusing position or a fixed focus position, the control program comprising:
detecting a shutter operation in the middle of a focusing action of said focusing mechanism;
measuring a focusing value with an origin at a lens position where a focus position becomes an infinity, during the focusing action;
making the measured focusing value into a maximum focusing value if the measured focusing value is not smaller than a maximum focusing value;
deciding whether the optical system is in a final lens position or not during a focusing action of the focusing mechanism;
detecting said shutter operation and, if the optical system is not in the final lens position, switches to said fixed focus position from said auto-focusing position of said optical system under the focusing action;
comparing between a time required for bringing into focus in said focusing mechanism and a time from starting of the focusing action until starting of said shutter operation, and changing said optical system to said auto-focusing position or said fixed focus position based on a result of the comparison; and
taking a fixed focus image caught at said fixed focus.

14. A computer readable recording medium storing a photographing control program of an electronic device having an imaging part which catches an image obtained through an optical system, and a focusing mechanism which moves said optical system to an auto-focusing position or a fixed focus position, the control program comprising:
detecting a shutter operation in the middle of a focusing action of said focusing mechanism;
measuring a focusing value with an origin at a lens position where a focus position becomes an infinity, during the focusing action;
making the measured focusing value into a maximum focusing value if the measured focusing value is not smaller than a maximum focusing value;
deciding whether the optical system is in a final lens position or not during a focusing action of the focusing mechanism;
detecting said shutter operation and, if the optical system is not in the final lens position, takes an auto-focusing image caught by said imaging part in the middle of the focusing action; and
comparing between a time required for bringing into focus in said focusing mechanism and a time from starting of the focusing action until starting of said shutter operation, and changing said optical system to said auto-focusing position or said fixed focus position based on a result of the comparison.

15. An integrated circuit to which an imaging part catching an image obtained through an optical system and a focusing mechanism moving said optical system to an auto-focusing position or a fixed focus position are connected externally, comprising:
a detection part that detects a shutter operation in the middle of a focusing action of said focusing mechanism and a focusing value measured with an origin at a lens position where a focus position becomes an infinity, during the focusing action; and
a control part that decides whether the optical system is in a final lens position or not and, on the basis of a detection of said shutter operation of said detection part, switches to said fixed focus position from said auto-focusing position of said optical system under the focusing action and takes a fixed focus image caught at said fixed focus if the optical system is not in the final lens position, wherein said control part makes the measured focusing value into a maximum focusing value to perform the decision if the measured focusing value is not smaller than a maximum focusing value, and wherein said control part compares between a time required for bringing into focus in said focusing mechanism and a time from starting of the focusing action until starting of said shutter operation, and changes said optical system to said auto-focusing position or said fixed focus position based on a result of the comparison.

16. An integrated circuit to which an imaging part catching an image obtained through an optical system and a focusing mechanism moving said optical system to an auto-focusing position or a fixed focus position are connected externally, comprising:

a detection part that detects a shutter operation under a focusing action of said focusing mechanism and a focusing value measured with an origin at a lens position where a focus position becomes an infinity, during the focusing action; and a control part that decides whether the optical system is in a final lens position or not and takes an auto-focusing image in the middle of the focusing action based on a detection of said shutter operation of said detection part if the optical system is not in the final lens position, wherein said control part makes the measured focusing value into a maximum focusing value to perform the decision if the measured focusing value is not smaller than a maximum focusing value, and wherein said control part compares between a time required for bringing into focus in said focusing mechanism and a time from starting of the focusing action until starting of said shutter operation, and changes said optical system to said auto-focusing position or said fixed focus position based on a result of the comparison.

* * * * *